(12) United States Patent
Komma et al.

(10) Patent No.: US 8,050,168 B2
(45) Date of Patent: Nov. 1, 2011

(54) OPTICAL HEAD DEVICE, OPTICAL INFORMATION DEVICE, COMPUTER, DISC PLAYER, CAR NAVIGATION SYSTEM, OPTICAL DISC RECORDER, AND VEHICLE

(75) Inventors: Yoshiaki Komma, Osaka (JP); Fumitomo Yamasaki, Nara (JP); Katsuhiko Hayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 287 days.

(21) Appl. No.: 12/374,403

(22) PCT Filed: Jul. 18, 2007

(86) PCT No.: PCT/JP2007/064150
§ 371 (c)(1),
(2), (4) Date: Jan. 20, 2009

(87) PCT Pub. No.: WO2008/010506
PCT Pub. Date: Jan. 24, 2008

(65) Prior Publication Data
US 2009/0245075 A1   Oct. 1, 2009

(30) Foreign Application Priority Data
Jul. 21, 2006  (JP) .................................. 2006-199796

(51) Int. Cl.
*G11B 7/00* (2006.01)
(52) U.S. Cl. ......... 369/112.08; 369/112.07; 369/112.25; 369/112.26
(58) Field of Classification Search ............. 369/112.25, 369/112.26, 112.07, 112.08
See application file for complete search history.

(56) References Cited

U.S. PATENT DOCUMENTS

| | | | |
|---|---|---|---|
| 5,446,565 A | | 8/1995 | Komma et al. |
| 6,192,021 B1 | * | 2/2001 | Saito et al. ................... 369/53.2 |
| 2005/0030878 A1 | * | 2/2005 | Park et al. ............... 369/112.08 |

FOREIGN PATENT DOCUMENTS

| | | |
|---|---|---|
| JP | 01-307023 | 12/1989 |
| JP | 07-098431 | 4/1995 |
| JP | 09-027133 | 1/1997 |
| JP | 2000-207769 | 7/2000 |
| JP | 2003-059069 | 2/2003 |

OTHER PUBLICATIONS

International Search Report for corresponding Application No. PCT/JP2007/064150 mailed Oct. 23, 2007.
Form PCT/ISA/237 and partial English translation, Oct. 23, 2007.

* cited by examiner

*Primary Examiner* — Latanya Bibbins
(74) *Attorney, Agent, or Firm* — Renner, Otto, Boisselle & Sklar, LLP

(57) ABSTRACT

An optical head device compatible to different types of optical discs and capable of guaranteeing a sufficiently wide dynamic range for a low density optical disc, and the like are provided.

The optical head device includes a plurality of light sources switchably usable; an objective lens for converging light emitted from one of the plurality of light sources to an information recording layer of an optical disc; and a light detector for receiving the light reflected by the information recording layer and outputting an electric signal based on the amount of the received light. The plurality of light sources include a first light source for emitting light having a first wavelength and a second light source for emitting light having a second wavelength shorter than the first wavelength. In the optical head device, a defocus detection range of a focusing error signal obtained based on the light having the first wavelength is set to be wider than a defocus detection range of a focusing error signal obtained based on the light having the second wavelength.

18 Claims, 17 Drawing Sheets

FIG.1
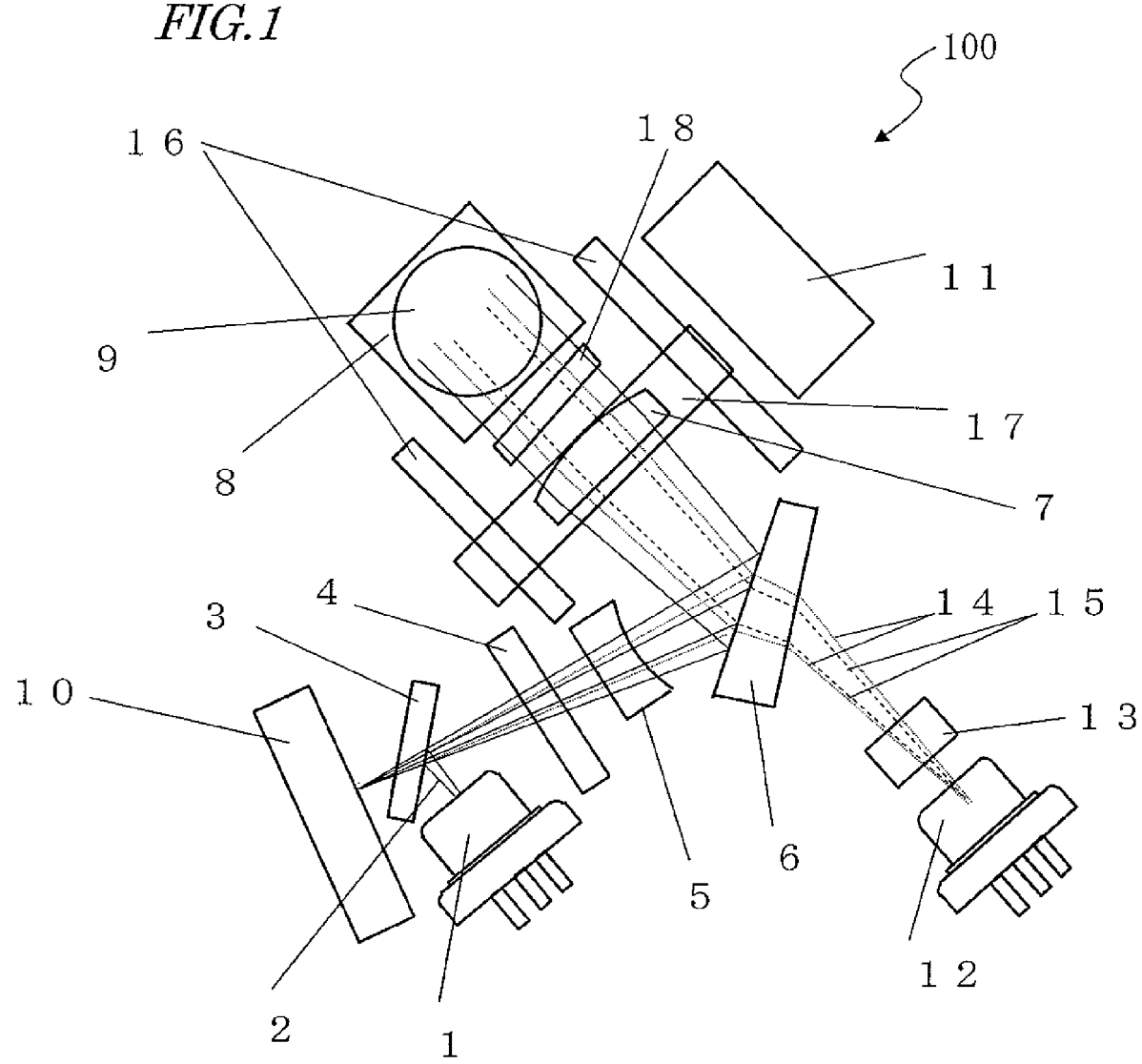
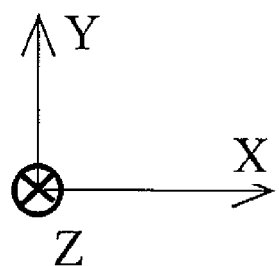

FIG.3
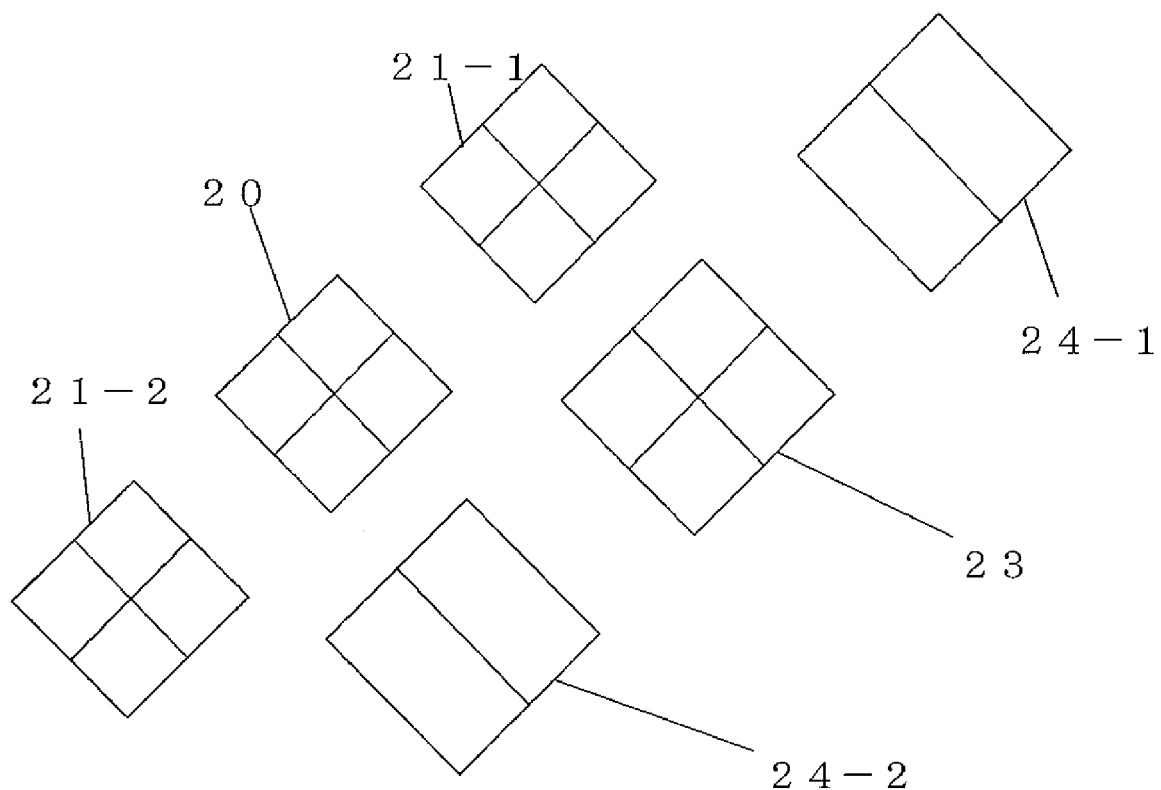
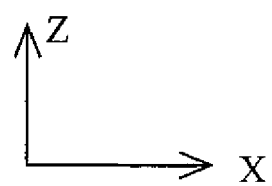

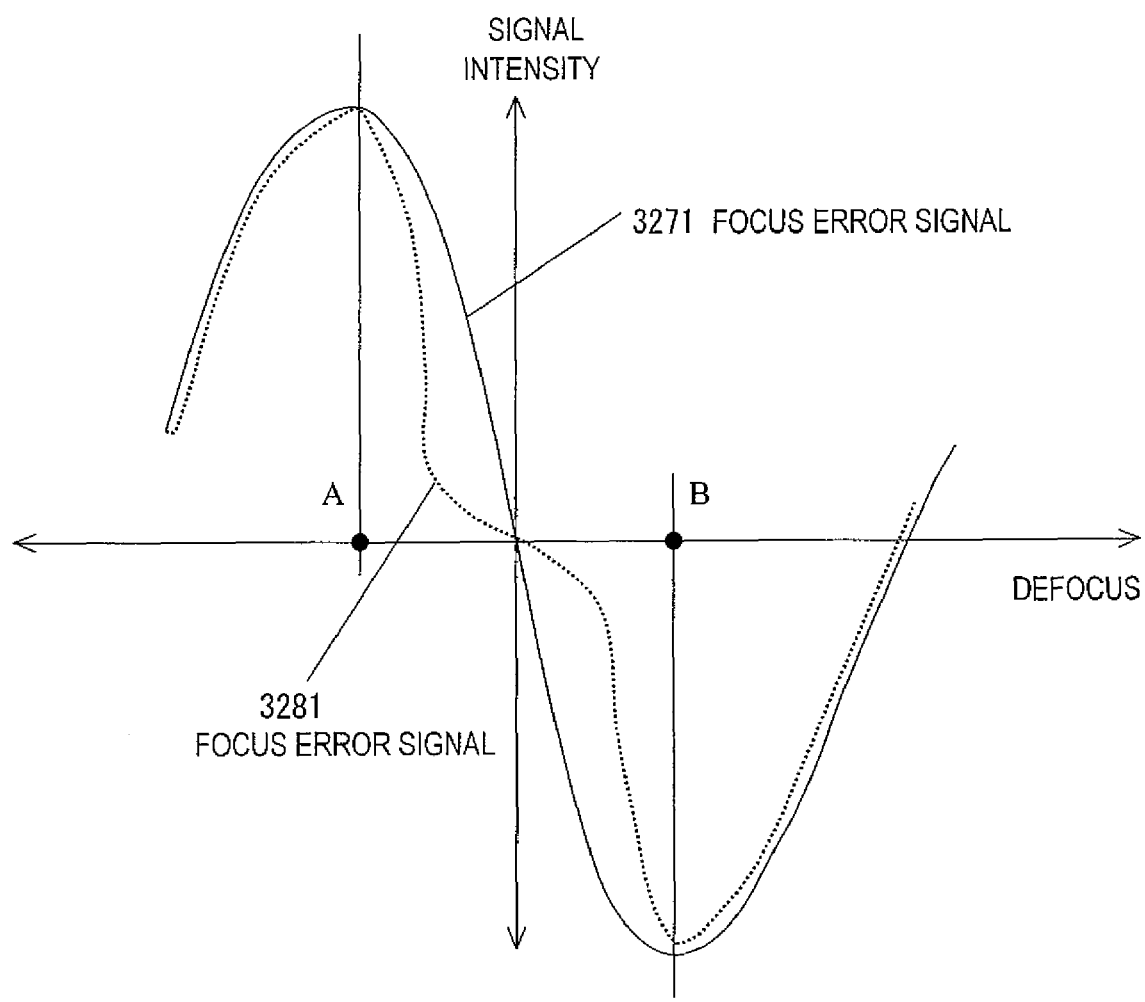

OPTICAL HEAD DEVICE, OPTICAL INFORMATION DEVICE, COMPUTER, DISC PLAYER, CAR NAVIGATION SYSTEM, OPTICAL DISC RECORDER, AND VEHICLE

TECHNICAL FIELD

The present invention relates to an optical information apparatus for reproducing information from, or recording information to, an information recording medium exemplified by an optical disc, an optical head device for reproducing or recording information in such an optical information apparatus, and an information apparatus and system using the same.

BACKGROUND ART

A digital versatile disc (DVD) allows digital information to be recorded thereon at a recording density about six times higher than a compact disc (CD), and is known as an optical disc capable of storing large capacity data. Along with the recent increase of the information quantity to be recorded on optical discs, an optical disc having a larger recording capacity is desired.

In order to increase the recording capacity of an optical disc, the recording density of information needs to be increased. Specifically, the size of an optical spot formed by light which irradiates an optical disc for recording information to the optical disc or reproducing information recorded on the optical disc needs to be decreased. For realizing this, it is necessary to decrease the wavelength of laser light from a light source and to increase the numerical aperture (NA) of an objective lens.

For DVDs, a light source for emitting light having a wavelength of 660 nm and an objective lens having a numerical aperture (NA) of 0.6 are used. For, for example, Blu-ray discs (BD) having a larger recording capacity, blue laser light having a wavelength of 405 nm and an objective lens having an NA of 0.85 are used. Thus, a recording density five times higher than that of an existing DVD is achieved.

For an optical information apparatus for performing high density recording and reproduction using laser light having a short wavelength, such as blue laser light or the like, compatibility with existing optical discs can improve usefulness thereof as an apparatus and increase cost performance. Conventionally, an optical head device as described below is available for realizing an optical information apparatus capable of compatibly performing recording to, or reproduction from, a plurality of optical discs of different recording densities.

FIG. 17 shows an example of a structure of a conventional optical head device.

A light beam 210 emitted from a light source 201 is transmitted through a polarization anisotropic hologram 202. The light beam 201 is converted into parallel light by a collimator lens 203 and is changed into light of circular polarization by a ¼ wavelength plate 204. A first objective lens 205 converges the light beam 210 on an information recording layer of an optical disc 327.

For an optical disc 328 of a lower recording density than that of the optical disc 327, only an inner part of the light beam close to an optical axis thereof is converged by a second objective lens 250 having a smaller numerical aperture (as represented with the dotted line). The first and second objective lenses are mechanically exchanged in accordance with the type of the optical disc. Where a single objective lens is used, a variable aperture is used to change the numerical aperture for the optical disc.

The light of circular polarization which is reflected by the optical disc follows the same optical path in the opposite direction. During this process, the light is converted by the ¼ wavelength plate 204 into light of linear polarization of a direction perpendicular to the light emitted from the light source 201. Therefore, the light is diffracted by the polarization anisotropic hologram 202 to be incident on light detectors 263 and 266. Based on signals obtained from the light detectors, the objective lens is moved along the optical axis to perform focusing control.

When the effective diameter of the light beam is reduced in order to apply a smaller numerical aperture for a disc of a lower recording density, the diffracted light is made smaller as diffracted light 213 and 214 (dotted lines) on the light detectors shown in a bottom part of FIG. 17.

FIG. 18 shows a waveform of a focusing error signal obtained from a conventional optical head device. A focusing error signal 3281 is reduced in the inclination angle in the vicinity of the center of the graph; namely, the sensitivity thereof is decreased. In order to avoid such a decrease of the sensitivity in the vicinity of the center, as shown the bottom part of FIG. 17, the width of divided areas of the light detectors is partially changed and the signal to be used is also changed in accordance with the change of the numerical aperture. By changing the numerical aperture in this manner, a focusing error signal 3271 with a constant sensitivity can be obtained.

Patent Document 1: Japanese Laid-Open Patent Publication No. 2000-207769

DISCLOSURE OF THE INVENTION

Problems to be Solved by the Invention

Among optical discs practically used so far, newer optical discs are of a higher recording density. Historically, the recording density has been increased from low to high in the order of compact disc (CD), DVD, HD-DVD, Blu-ray disc (BD).

Earlier optical discs were developed with a lower production technology. Therefore, CDs are distorted in shape more often and at a higher extent than DVDs or BDs. In other words, an optical disc of a higher recording density is produced at a higher flatness in order to realize higher precision.

A disc of a lower recording density is quite distorted, and so when such a disc is mounted on an optical information apparatus and rotated by a spindle motor, the level of the information recording layer moves up and down. This is generally called "face movement".

In order to start a focus servo loop with certainty for a disc which may cause a large face movement, a focusing error signal having a wide dynamic range needs to be used. Specifically, referring to FIG. 18, it is desirable that defocus point A, at which the focusing error signal has the maximum strength, and defocus point B, at which the focusing error signal has the minimum strength, have a large separation therebetween.

Meanwhile, information recording on BDs needs to be done at a high density almost 40 times higher than CDs, using blue laser light and a high numerical aperture (NA: 0.85). Therefore, the optical spot formed on the information recording layer of such an optical disc is smaller than that for a CD, and the focal depth is shallower than that for a CD. This requires focus servo (focus control) to be done more precisely. For realizing this, referring to FIG. 18, it is necessary that the defocus points A and B, at which the focusing error signal has the maximum strength and the minimum strength respectively, have a small separation therebetween so that the sensitivity between the defocus points A and B is high.

The above-described example of the conventional art is developed for the purpose of keeping focusing error signals linear and providing focusing error signals with the same sensitivity and the same dynamic range for different types of optical discs. Accordingly, a method for merely realizing focusing error signals having the same characteristics is provided. In the above example, there is no recognition found that a larger dynamic range is needed for CDs whereas a higher sensitivity is needed for BDs.

The above example of the conventional art has another problem as follows. This example only uses a single light source, and does not provide any appropriate structure for realizing, in an optical head device having a plurality of light sources, especially light sources for three different wavelengths, a required focusing error signal regardless of which wavelength is to be used, at the lowest possible cost.

An object of the present invention is to provide an optical head device which is compatible to different types of optical discs, guarantees a sufficiently wide dynamic range for lower density optical discs, and is produced at low cost.

Means for Solving the Problems

An optical head device according to the present invention includes a plurality of light sources switchably usable; an objective lens for converging light emitted from one of the plurality of light sources to an information recording layer of an optical disc; and a light detector for receiving the light reflected by the information recording layer and outputting an electric signal based on the amount of the received light. The plurality of light sources include a first light source for emitting light having a first wavelength and a second light source for emitting light having a second wavelength shorter than the first wavelength; and a defocus detection range of a focusing error signal obtained from an electric signal based on the amount of received light having the first wavelength is wider than a defocus detection range of a focusing error signal obtained from an electric signal based on the amount of received light having the second wavelength.

The light having the first wavelength reflected by the information recording layer and the light having the second wavelength reflected by the information recording layer may be both incident on the light detector; and the light detector may perform photoelectric conversion on the incident light to generate an electric signal for obtaining a focusing error signal.

The optical head device may further include an optical element located on an optical path on which the light reflected by the information recording layer proceeds until being incident on the light detector, the optical element giving astigmatism to light transmitting therethrough; and the light detector may receive the light reflected by the information recording layer and given the astigmatism to generate the focusing error signal by an astigmatism method.

The optical head device may further include a rising mirror for turning the light emitted from one of the plurality of light sources in a direction vertical to the optical disc; and an optical axis of the light incident on the rising mirror may have an angle of about 45 degrees with respect to a track groove of the optical disc.

The light having the first wavelength emitted from the first light source and the light having the second wavelength emitted from the second light source may be both incident on the objective lens.

The objective lens may include at least an inner zone including an optical axis and an outer zone surrounding the inner zone, and the inner zone may include a central area including the optical axis and an outer peripheral area outer with respect to the central area; and the light having the first wavelength passing through the central area may be converged to a first position on the information recording layer of the optical disc, and the light having the first wavelength passing through the outer peripheral area may be given a spherical aberration to be converged to at least one second position, which is different from the first position in a direction vertical to the optical disc.

The light having the first wavelength passing through the outer peripheral area may be converged to a position farther from the objective lens than the first position by the spherical aberration.

The plurality of light sources may further include a third light source for emitting light having a third wavelength shorter than the second wavelength; the objective lens may converge the light, having the first wavelength passing through the central area of the inner zone, through a transparent substrate of the first optical disc; may converge the light, having the third wavelength passing through an area through the central area and the outer zone surrounding the inner zone, through a transparent substrate of the third optical disc; and may converge the light, having the second wavelength passing through an effective diameter zone of the objective lens, through a transparent substrate of the second optical disc.

The inner zone of the objective lens may be designed such that an average value of sums of squares of the aberrations of the light having the first wavelength passing through the inner zone is equal to or less than 20 m$\lambda$.

A focal distance f1 of the objective lens for converging the light having the first wavelength may be longer than a focal distance f2 of the objective lens for converging the light having the second wavelength.

The light having the first wavelength reflected by the information recording layer and the light having the second wavelength reflected by the information recording layer may be both incident on the light detector; and the light detector may perform photoelectric conversion on the incident light to generate an electric signal for obtaining a focusing error signal.

The optical head device may further include a parallel plate for reflecting the light having the second wavelength emitted from the second light source; and an optical element for reflecting the light having the second wavelength reflected by the parallel plate and transmitting the light having the first wavelength emitted from the first light source.

An objective lens according to the present invention is used, in an optical head device including a plurality of light sources switchably usable, for converging light emitted from one of the plurality of light sources to an information recording layer of an optical disc. The plurality of light sources of the optical head device further include a first light source for emitting light having a first wavelength and a second light source for emitting light having a second wavelength shorter than the first wavelength; the objective lens includes at least an inner zone including an optical axis and an outer zone surrounding the inner zone; and the light having the first wavelength passing through an central area is converged to a first position on the information recording layer of the optical disc, and the light having the first wavelength passing through an outer peripheral area is given a spherical aberration to be converged to at least one second position, which is different from the first position in a direction vertical to the optical disc.

The light having the first wavelength passing through the outer peripheral area may be converged to a position farther from the objective lens than the first position by the spherical aberration.

In the case where the plurality of light sources of the optical disc device further include a third light source for emitting light having a third wavelength shorter than the second wavelength, the objective lens may converge the light, having the first wavelength passing through the central area of the inner zone, through a transparent substrate of the first optical disc; may converge the light, having the third wavelength passing through the central area and the outer zone surrounding the inner zone, through a transparent substrate of the third optical disc; and may converge the light, having the second wavelength passing through an effective diameter zone of the objective lens, through a transparent substrate of the second optical disc.

The inner zone may be designed such that an average value of sums of squares of the aberrations of the light having the first wavelength passing through the inner zone is equal to or less than 20 m$\lambda$.

A focal distance f1 for converging the light having the first wavelength may be longer than a focal distance f2 for converging the light having the second wavelength.

An optical information apparatus according to the present invention includes the above-described optical head device; a motor for rotating the optical disc; and a circuit for controlling and driving the motor, an optical lens and the light source based on a signal obtained from the optical head device.

A computer according to the present invention includes the above-described optical information apparatus; an input device or an input terminal for inputting information; a calculation device for performing a calculation based on at least one of information input from the input device and information reproduced by the optical information apparatus; and an output device or an output terminal for displaying or outputting at least one of information input from the input device, information reproduced by the optical information apparatus, and a calculation result obtained by the calculation device.

An optical disc player according to the present invention includes the above-described optical information apparatus; and an information-to-image decoder for converting an information signal obtained by the optical information apparatus into an image.

A car navigation system according to the present invention includes the above-described optical information apparatus; an information-to-image decoder for converting an information signal obtained by the optical information apparatus into an image; and a positional sensor.

An optical disc recorder according to the present invention includes the above-described optical information apparatus; and an encoder for converting image information into information of a format recordable by the optical information apparatus. The post-conversion image information is recorded on an optical disc.

A vehicle according to the present invention includes a vehicle body having the above-described optical information apparatus mounted thereon; and a power generation section for generating power for moving the vehicle body.

Effects of the Invention

According to an optical head device of the present invention, when information is reproduced from, or recorded to, a high density optical disc using an objective lens having a large numerical aperture (NA), a high sensitivity focusing error signal can be obtained. Therefore, recording or reproduction can be stably performed with highly precise focus servo. With the same optical head device, when information is reproduced from, or recorded to, a low density optical disc, a focusing error signal having a wide dynamic range can be obtained. Therefore, even where there is a shape error, focus servo can be performed with certainty.

According to an optical head device of the present invention, an optical system including a plurality of light sources to be compatible to a plurality of types of optical discs can be provided with a small number of components, in a simple manner and at low cost.

An optical information apparatus using an optical head device according to the present invention enables information to be stably reproduced from a larger capacity optical disc or a plurality of optical discs of different recording densities with a single optical head device.

BRIEF DESCRIPTION OF THE DRAWINGS

FIG. 1 shows a structure of an optical head device 100 according to Embodiment 1.

FIG. 3 shows an example of dividing a light detection area of a light detector 10, which is preferable to detect a focusing error signal by an astigmatism method.

FIG. 18 shows a waveform of a focusing error signal obtained in a conventional optical head device.

Figure 2:
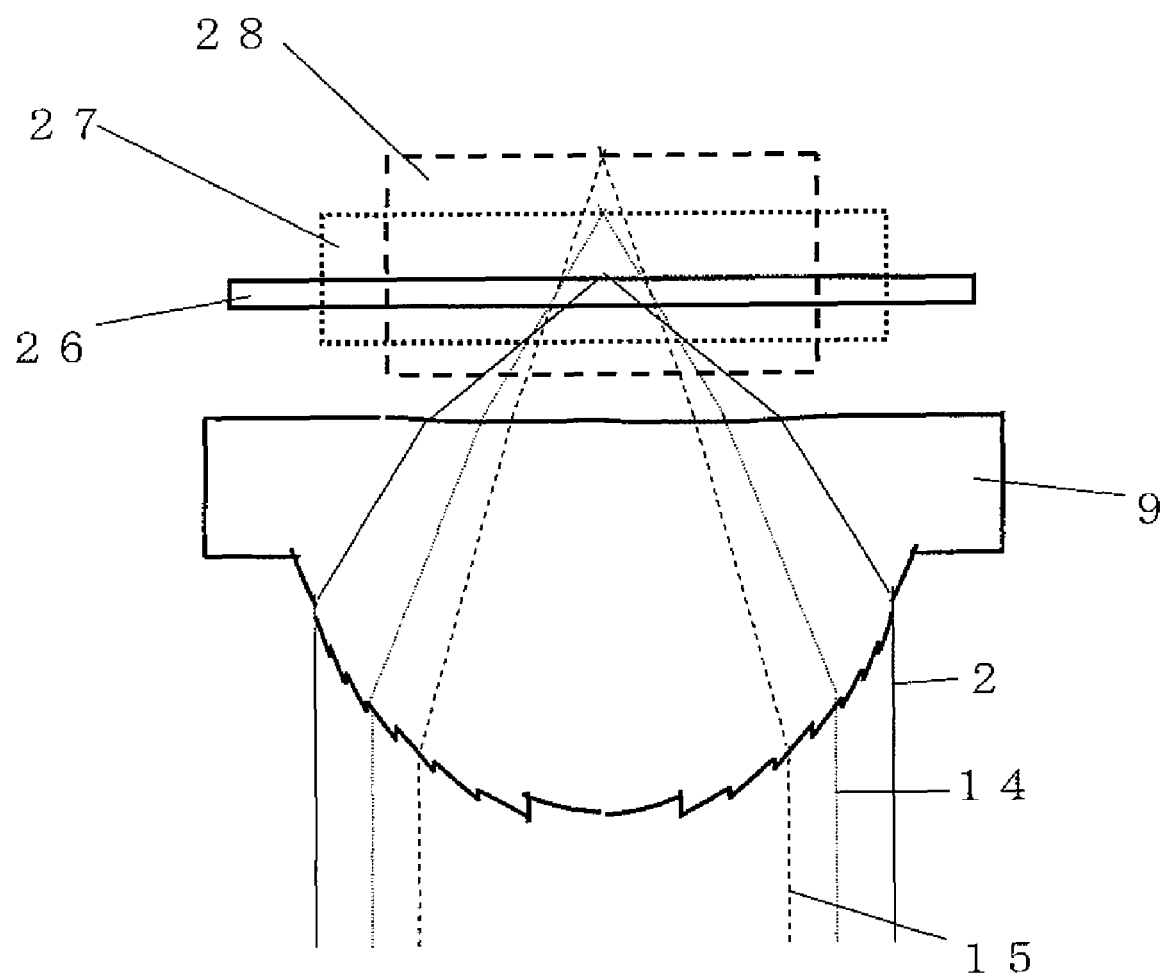
FIG. 2 shows an example of an objective lens 9.

DESCRIPTION OF THE REFERENCE NUMERALS 1, 12 Light source module
2, 14, 15 Light beam
3 Parallel plate
4 Hologram element
5 Relay lens
6 Wedge
7 Collimator lens
8 Rising mirror
9, 25 Objective lens
10 Light detector
13 Diffraction element
18 ¼ wavelength plate
40 Inner zone of the objective lens 9
41 Middle zone of the objective lens 9
42 Outer zone of the objective lens 9
43 Infrared light passing through an central area of the inner zone area 40
44 Infrared light passing through an outer peripheral area of the inner zone area 40
100, 200 Optical head device

BEST MODE FOR CARRYING OUT THE INVENTION

With reference to the attached drawings, embodiments of the present invention will be described.

Embodiment 1

FIG. 1 shows a structure of an optical head device 100.

The optical head device 100 includes semiconductor laser elements (hereinafter, referred to as "light sources") for emitting light beams of at least two different wavelengths, and is capable of recording information to, and/or reproducing information from, different types of optical discs. In the following description, there are three light sources for recording information to, and/or reproducing information from, a BD, a DVD and a CD.

The optical head device 100 includes light source modules 1 and 12, a parallel plate 3, a hologram element 4, a relay lens 5, a wedge 6, a collimator lens 7, a rising mirror 8, an objective lens 9, a light detector 10, a diffraction element 13, and a ¼ wavelength plate 18.

Hereinafter, functions of these elements will be described through a description of an operation of the optical head device 100 for providing light. In FIG. 1, Y axis is vertical to an optical axis of the objective lens 9 and is generally vertical to a direction of track grooves of an optical disc (not shown), and Z axis is in a direction of the optical axis of the objective lens 9, namely, the focusing direction (vertical to the sheet of FIG. 1). Y axis is in a direction in which the optical head device is to be moved for recording information to, or reproducing information from, a position in an inner zone or a position in an outer zone of the optical disc. X axis is vertical to Z axis and Y axis, and is generally parallel to the direction of the track grooves of an optical disc as seen from the position of the objective lens 9. The optical head device 100 may have a mirror reverse structure in which X axis and Y axis are exchanged, or a structure which is rotated from the state in FIG. 1 by 90 degree, 180 degrees or 270 degrees.

The light source module 1 includes a semiconductor laser element which is a short wavelength light source (for example, a blue light source). For BDs, a light beam 2 is emitted from the blue light source of the light source module 1.

The light beam 2 of linear polarization emitted from the short wavelength light source is reflected by a polarization separation film at a surface of the parallel plate 3 and is transmitted through the hologram element 4. The light beam 2 transmitted through the hologram element 4 is converted by the relay lens 5 into a luminous flux diverging more widely. The relay lens 5 has a concave lens function. The relay lens 5 converts a small point ahead angle from the aperture of the objective lens 9 toward the light source module 1, i.e., a small numerical aperture (NA) on the side of, and in the vicinity of, the light source into a large NA on the side of the collimator lens 7.

Next, the collimator lens 7 changes the parallel degree of the light beam 2. For example, the collimator lens 7 converts a light beam 14 to generally parallel light. The collimator lens 7, which is for reducing the parallel degree, i.e., reducing the diverging degree, may be formed of a combination of two lenses. In the case where the collimator lens 7 is formed of two lenses, when the collimator lens 7 is moved along an optical axis thereof in order to correct the spherical aberration, only one of the two lenses may be moved. The ¼ wavelength plate 18 changes the linear polarization into circular polarization. The rising mirror 8 turns the optical axis of the light from the collimator lens 7 in a direction of Z axis, which is perpendicular to the optical disc. In this embodiment, the optical axis of the light incident on the rising mirror 8 has an angle of about 45 degrees, or more roughly, an angle in a range of 35 degrees to 55 degrees, with respect to the track grooves of the optical disc. This provides an advantage as described later. For example, the tangential line of the track grooves of the optical disc is parallel to Y axis.

As described later, when light is branched by the parallel plate 3 to be directed toward the light source module 1 and the light detector 10, the light transmitted through the parallel plate 3 is provided with astigmatism. When the angle between the optical axis of the light incident on the rising mirror 8 and the track grooves is changed from 35 degrees to 55 degrees, the angle between the focal line of the astigmatism and the track grooves is changed from 35 degrees to 55 degrees. Thus, by providing four divided areas of the light detector 10 to allow light having astigmatism to be incident thereon and using signals obtained from the four divided areas, a focusing error signal and also a tracking error signal by a known push-pull method or differential phase detection method can be obtained.

The objective lens 9 converges the light beam 2 on an information recording layer of a high density optical disc such as a BD or the like through a transparent substrate having a thickness smaller than 0.6 mm, for example, about 0.1 mm. The objective lens 9 will be described later in detail.

The light beam reflected by the information recording layer of the optical disc follows the same optical path in the opposite direction. The ¼ wavelength plate 18 changes the reflected light beam into light of linear polarization which is vertical to the polarization direction of the light beam advancing toward the optical disc. The light of the linear polarization is reflected by the wedge 6 and is transmitted through the relay lens 5 and the hologram element 4. The hologram element 4 diffracts a part of the beam. The light beam transmitted through the hologram element 4 and the partial light diffracted by the hologram element 4 are transmitted through the parallel plate 3 having the polarization separation film on a surface thereof, and are branched in a different direction from the direction toward the light source module 1, to be incident on the light detector 10. The light detector 10 performs photoelectric conversion on the incident light to generate an electric signal for obtaining an information signal and a servo signal. A "servo signal" is a general term referring to a focusing error signal for focus control, i.e., focus servo or a tracking signal for tracking control.

A reflective hologram (not shown) may be provided at a position which is off the optical axis of the hologram element 4 and does not shield the light incident on the objective lens 9. By receiving diffracted light reflected by such a reflective hologram by the light detector 10 and monitoring the light intensity of the light beam 2, a monitoring signal for stabilizing the light intensity can be obtained without increasing the number of components.

Now, a light beam output from the light source module 12 will be described.

The light source module 12 includes a semiconductor laser element which is, for example, an infrared light source. For an optical disc of a lower recording density than that of a BD (for example, a compact disc (CD)), a light beam 14 is emitted by the infrared light source of the light source module 12. The light beam 14 emitted by the infrared light source is transmitted through a diffraction element 13 which diffracts a part of the light in order to form a sub spot on the optical disc (partial diffraction), and is transmitted through the wedge 6 having a wedge-shaped cross-section. Then, the light is incident on the collimator lens 7.

Next, the light beam 14 incident on the collimator lens 7 is changed in the parallel degree. For example, the light beam 14 is converted into generally parallel light by the collimator lens 7.

Then, the polarization direction of the light beam 14 is converted by the ¼ wavelength plate 18. The optical axis of the resultant light is bent by the rising mirror 9 to a direction perpendicular to an optical disc of a lower recording density than that of the BD (for example, a compact disc (CD)). The objective lens 9 converges the light beam 14 on an information recording layer of the optical disc through a transparent substrate having a thickness of about 1.2 mm.

The light beam reflected by the information recording layer of the optical disc follows the same optical path in the opposite direction and is branched by a polarization selective film provided on a surface of the collimator lens 7 in a different direction from the direction toward the light source module 12, to be incident on the light detector 10 as in the case of the light beam 2. In an optical head device such as a reproduction-only optical head device or the like, in which the light utilization factor may be low, a non-polarization branching film may be used instead of the polarization selective film.

The light detector 10 performs photoelectric conversion on the incident light to generate an electric signal for obtaining an information signal and a servo signal. In the case where an amplifier circuit is built in the light detector 10, a good information signal having a high signal-to-noise ratio (S/N ratio) can be obtained while a thin, compact and stable optical head device can be realized.

The light source module 12 also includes a semiconductor laser element which is, for example, a red light source. The red light source is used for reproducing information from, or recording information to, an optical disc of a middle recording density between the above-described two types of optical discs (for example, a DVD).

The light source 12 includes a red light source and an infrared light source in this embodiment, but these light sources may be provided separately. In such a case, the red light source may be located in the vicinity of the infrared light source and a beam splitter may be provided for aligning an optical path for the red light source and an optical path for the infrared light source. However, provision of a beam splitter increases the number of component. Therefore, it is preferable to provide the red light source and the infrared light source in the light source module 12 in order to suppress the increase of the number of components, which would be caused by providing the beam splitter. In this embodiment, the red light source or the infrared light source is additional, and the effects of the present invention described later can be obtained as long as at least either one of the red light source and the infrared light source is provided in addition to the blue light source.

A light beam 15 of red light emitted from the light source module 12 follows substantially the same optical path as that of the infrared light to reach the objective lens 9 and is converged by the objective lens 9 on an information recording layer of the optical disc such as a DVD or the like through a transparent substrate having a thickness of about 0.6 mm. Then, the light beam reflected by the information recording layer of the optical disc follows the same optical path in the opposite direction to be incident on the light detector 10. The light detector 10 performs photoelectric conversion on the incident light to generate an electric signal for obtaining an information signal and a servo signal.

Generally in order to branch an optical path, a cubic beam splitter obtained by attaching two triangular transparent elements together may be used. However, using a parallel plate and a wedge as in the present invention reduces the number of components and so their costs. It should be noted that in the case where a single beam splitter is provided on a non-parallel optical path from the light source to the objective lens for light transmission, it is desirable to use a wedge like the wedge 6 in this embodiment and set the incident angle of the optical axis to smaller than 45 degrees, in order to prevent occurrence of astigmatism.

Even with such considerations, astigmatism may occur due to production errors or the like. Accordingly, in the example of the present invention shown in FIG. 1, the light beam 2 to be converged on the optical disc of the highest recording density is reflected by, instead of being transmitted through, the two beam splitters on the non-parallel optical path from the light source 1 to the collimator lens 7. This provides an effect of realizing good signal reproduction or signal recording even for an optical disc of the highest recording density such as a BD or the like.

The objective lens 9 is fixed at a prescribed position in an actuator (not shown) for fine-moving the objective lens 9. The actuator is capable of fine-moving the objective lens 9 both in a focusing direction (Z axis direction) perpendicular to the information recording layer of the optical disc and a tracking direction (Y axis direction) of the optical disc.

Where an objective lens having an NA of 0.85 or larger is used as the objective lens 9 for reproducing information from, or recording information to, a BD or the like, a conspicuous spherical aberration occurs due to the thickness of the transparent substrate existent between the light incidence face and the information recording layer of the optical disc because the numerical aperture is large.

In this embodiment, a driving device 11 and a driving mechanism are used to move the collimator lens 7 in the optical axis direction thereof, so that the diverging or converging degree of the light proceeding from the collimator lens 7 toward the objective lens 9 is changed. When the diverging or converging degree of the light incident on the objective lens changes, the spherical aberration changes. Utilizing this, the spherical aberration caused by the difference in the substrate thickness is corrected. As the driving device 11, a stepping motor or a brushless motor is usable, for example. The driving mechanism includes a holder 17 for holding the collimator lens 7, guide shafts 16 for guiding the movement of the holder 17, and a gear (not shown) for conveying the driving force of the driving motor 11 to the holder 17. The holder 17 for holding the collimator lens 7 may be integrated with the collimator lens 7, in which case the number of components can be reduced.

In the present invention, the optical axis of the collimator lens 7 is not parallel to Y axis. This prevents the collimator lens 7 from making an unintentional movement against the inertial force generated by acceleration or deceleration when the entire optical head device is moved inward along the optical disc.

An optical recording system using a blue light source or a red light source is provided for the purpose of performing large capacity recording or reproduction by increasing the recording density though use of a short wavelength. In order to handle large capacity information, the recording or reproduction speed of information needs to be increased. Especially for recording, the light emission intensity needs to be changed at a high speed for high speed recording. Namely, in order to modulate the light intensity at a high speed, the electric current flown to emit light from a blue LD light source needs to be modulated at a high speed. For this purpose, a current control circuit or a large scale integration (LSI) needs to be located in the vicinity of the light source. Circuits for controlling a light emitting current are largely common for blue light and red light, and so need to be provided as a single LSI in order to reduce the size of the circuit.

In summary, it is desirable to provide a single LSI for controlling a light emitting current and locate a blue red source and a red light source in the vicinity thereof. It is also desirable to locate these elements in correspondence with the outer zone of the optical disc in order to enable recording or reproduction to be done in the inner zone of the optical disc, up to a closest possible position to the center of the disc.

It is desirable that the objective lens 9 is located on a line which generally passes the center of the optical disc, on which the optical head device is to be moved inward along the optical disc by a seek operation. Thus, it is made possible to form a sub beam by a diffraction grating 12 and detect a tracking signal by a three-beam method using the sub beam. As a result, stable signal detection can be performed.

FIG. 2 shows an example of the objective lens 9. The objective lens 9 converges the infrared light 15 in an innermost zone thereof in the vicinity of the optical axis through a transparent substrate having a thickness of about 1.2 mm of a low density optical disc 28 such as a CD or the like. The objective lens 9 converges the red light 14 expanding up to a middle zone thereof, which is larger than the inner zone to a certain extent, through a transparent substrate having a thickness of about 0.6 mm of an optical disc 27 such as a DVD or the like. The objective lens 9 converges the blue light 2 in an effective diameter zone thereof through a transparent substrate having a thickness of about 0.1 mm or less of a high density optical disc 26 such as a BD or the like.

In order to converge the light through transparent substrates having different thicknesses in this manner, it is effective to use a diffraction element as shown in FIG. 2. The diffraction element is provided on the opposite side of the objective lens 9 to the side facing the optical disc 26, 27 or 28.

The diffraction element is designed to be discontinuous among the innermost zone, the middle zone and the zone outer thereof, so that the innermost zone allows the light to be converged through any thickness of the substrate, whereas the outermost zone allows the light to be converged through only a substrate having a thickness of 0.1 mm or less. Such designing is facilitated by using, for example, light sources for different wavelengths as described above. For example, utilizing that the diffraction angle of the light diffracted by the diffraction grating varies among different wavelengths of light, i.e., infrared light for a CD, red light for a DVD and blue light for a BD, the spherical aberration caused by the thickness difference of the substrate can be corrected or the aperture limitation can be switched as described above in accordance with the type of disc.

Hereinafter, the term "design" used regarding an objective lens encompasses settings of optical performance of the diffraction element.

When the effective diameter of the objective lens 9 is changed as described above, there is an undesirable possibility that the linearity of a focusing error signal is not guaranteed where a spot size method using a size change of the optical spot is used for detecting a focusing error signal. One effective solution to this problem is using an astigmatism method. The reason is that the astigmatism method is for detecting a shift of the focal point using a shape change of the optical spot, instead of a size change of the optical spot.

FIG. 3 shows an example of dividing a light detection area of the light detector 10, which is preferable to detect a focusing error signal by the astigmatism method. The light detector 10 includes light receiving areas 20, 21-1, 21-2, 23, 24-1 and 24-2. FIG. 3 shows a pattern of the light receiving areas of the light detector 10 as seen from the side opposite to the light incidence side. In FIG. 3, X axis and Z axis are the same as those of FIG. 1.

The light receiving area 20 is provided for receiving blue light and red light. The light receiving area 20 is divided into four, and a focusing error signal is detected based on incident light using astigmatism given by the parallel plate 3. A tracking signal is also obtained by a so-called differential phase detection method or push-pull method.

The light receiving areas 21-1 and 21-2 each receive a sub beam diffracted by the diffraction grating 13 performed on the red light transmitting through the diffraction grating 13, and performs photoelectric conversion on the incident light. Signals output from the light receiving areas 21-1 and 21-2 are calculated together with a push-pull signal from the light receiving area 20 to be used for the detection by a differential push-pull method. A focusing error signal is also detected by the astigmatism method from the signals output from the light receiving areas 21-1 and 21-2. By calculating such signals together with the focusing error signal obtained from the light receiving area 20, crosstalk from the tracking error signal can be removed. A diffraction grating may be provided between the light source 1 and the parallel plate 3, in which case a sub beam signal of the blue light can be detected from the light receiving areas 21 and 22 as in the case of the red light.

The light receiving areas 23, 24-1 and 24-2 are provided for receiving infrared light. The distance between the central point of the light receiving area 20 and the central point of the light receiving area 23 is set to be a value obtained by multiplying the distance between the light emission point of red light and the light emission point of infrared light in the light source 12 by a magnification realized by the relay lens 5.

Where the distance between the central point of the light receiving area 20 and the central point of the light receiving area 21-1 is L1, and the distance between the central point of the light receiving area 23 and the central point of the light receiving area 24-1 is L2, the ratio between L1 and L2 is set to be equal to the ratio between the wavelength of the red light and the wavelength of the infrared light.

The light receiving area 23 is divided into four, and a focusing error signal is detected using astigmatism given by the parallel plate 3. A tracking signal is also obtained by a so-called differential phase detection method or push-pull method. The light receiving areas 24-1 and 24-2 each receive a sub beam diffracted by the diffraction grating 13 performed on the infrared light transmitting through the diffraction grating 13. By calculating signals output from the light receiving areas 24-1 and 24-2 together with a push-pull signal from the light receiving area 23, a tracking signal can be detected by the differential push-pull method.

Owing to a structure in which a plurality of light receiving areas are provided on a single light detector or a single semiconductor chip to perform photoelectric conversion on light of different wavelengths, the number of semiconductor components can be reduced.

Now, a method for obtaining a focusing error signal having a wide detection area in a defocus direction for an optical disc which is of a relatively low recording density and is distributed on the market as individual products causing a large face movement (for example, CD) will be described.

FIG. 4(a) shows light beams 43 and 44 of infrared light transmitting through the objective lens 9. FIG. 4(b) shows an effective diameter zone of the objective lens 9 for blue light as seen from the optical axis direction.

As seen from the optical axis direction, the objective lens 9 includes an inner zone 40, a middle zone 41 and an outer zone 42. Each area is designed with a different design value (parameter).

The objective lens 9 converges the infrared light 15 transmitting through the inner zone 40 including the optical axis through a transparent substrate having a thickness of about 1.2 mm of the low density optical disc 28 such as a CD or the like. The objective lens 9 is designed to give infrared light transmitting through the middle zone 41 and the outer zone 42 an aberration exceeding 70 mλrms, which is the Marechal Criterion, or not to transmit infrared light through the middle zone 41 or the outer zone 42 by use of a wavelength selective film. Or, the objective lens 9 is designed to allow the amount of such infrared light to be dispersed to a plurality of orders of diffracted light.

The objective lens 9 converges the red light 14 transmitting through the inner zone 40 and the middle zone 41 through a transparent substrate having a thickness of about 0.6 mm of the optical disc 27 such as a DVD or the like. The objective lens 9 is designed to give red light transmitting through the outer zone 42 an aberration exceeding 70 mλrms, which is the Marechal Criterion, or not to transmit red light through the outer zone 42 by use of a wavelength selective film. Or, the objective lens 9 is designed to allow the amount of such red light to be dispersed to a plurality of orders of diffracted light.

The objective lens 9 converges the blue 2 transmitting through effective diameter zones thereof, i.e., the three zones 40, 41 and 42 through a transparent substrate having a thickness of about 0.1 mm or less of the optical disc 26 such as a BD or the like. In other words, the inner zone 40 converges the optical beam to all of the CD, DVD and BD, the middle zone 41 converges the optical beam to the DVD and BD, and the outer zone 42 converges the optical beam only to the BD.

FIG. 4(a) shows luminous fluxes 43 and 44 of the infrared light transmitted through the inner zone 40. For the sake of simplicity, the refraction by the transparent substrate of the optical discs is omitted.

The objective lens 9 is designed to fulfill the following conditions. The infrared light 43, which passes through an inner area of the inner zone 40 including the optical axis, i.e., a central area of the inner zone 40, is converged to focal point F1 with almost no aberration. By contrast, the infrared light 44, which passes through an area included in the inner zone 40 but outer with respect to the central area and closer to the middle zone 41, i.e., an outer peripheral area of the inner zone 40, is given a high-order spherical aberration so as to be converged in the vicinity of convergence point F2, which is slightly away from the objective lens. It should be noted that an average value of sums of squares of the aberrations of both the infrared light 43 and the infrared light 44 passing through the inner zone 40 (RMS value) is set to be equal to or less than 20 mλ, desirably equal to or less than 10 mλ, in order not to obstruct reduction of the convergence spot on the optical disc to the diffraction limit.

The above-provided expression that the infrared light 44, which passes through the outer peripheral area of the inner zone 40 is "given a spherical aberration" means, as simply described, that the infrared light 44 passing the outer peripheral area of the inner zone 40 is converged at slightly different focal points or a plurality of positions in accordance with the distance between the point of transmission and the optical axis.

In general, the objective lens 9 is designed such that the light transmitted through the outer peripheral area of the inner zone 40 is also converged with no spherical aberration. However, one feature of this embodiment is to intentionally give a spherical aberration to the outer peripheral area of the inner zone 40.

Figure 5:
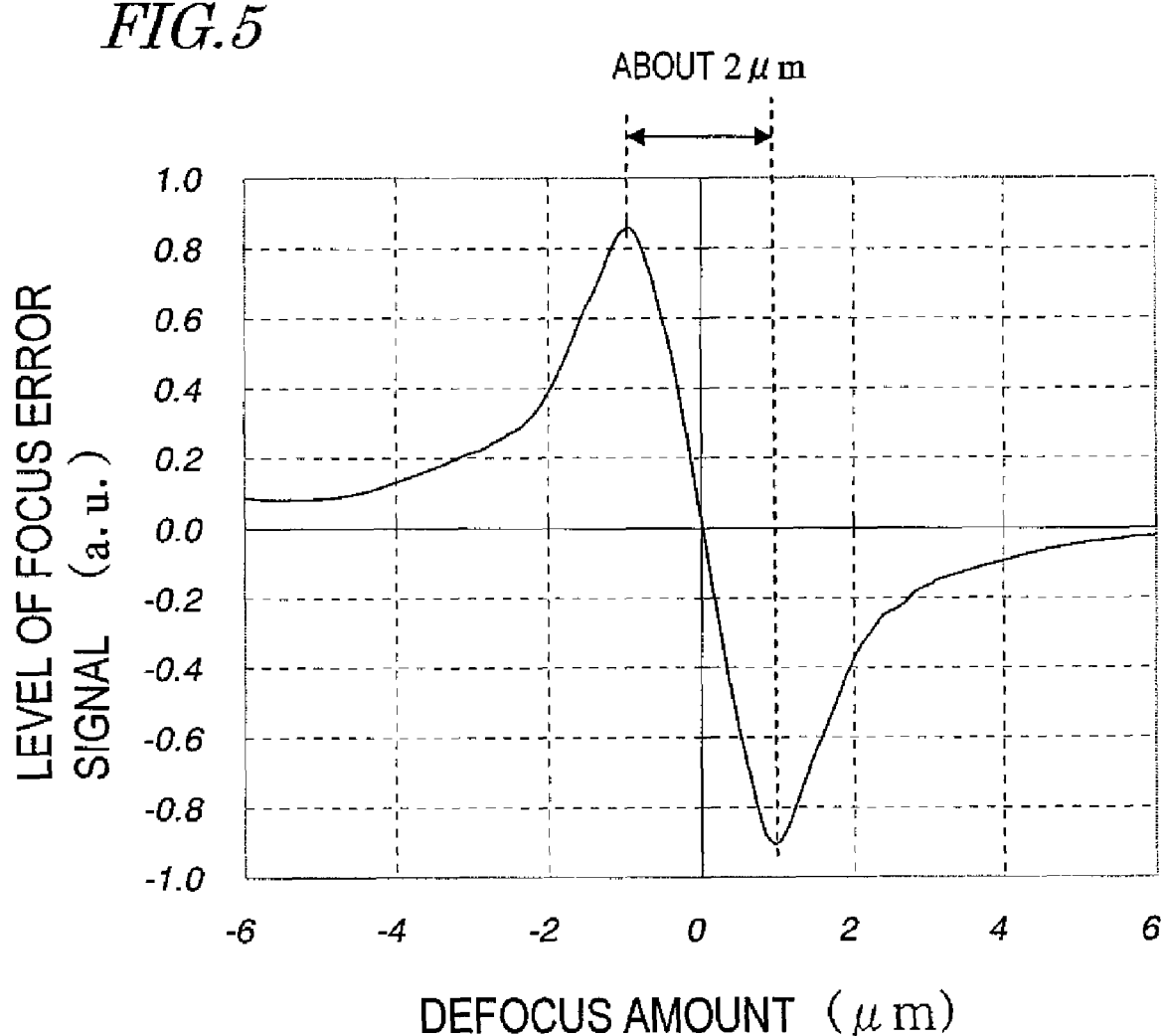
FIG. 5 shows a waveform of a focusing error signal obtained when a BD is irradiated with blue light from a light source 1.
Figure 6:
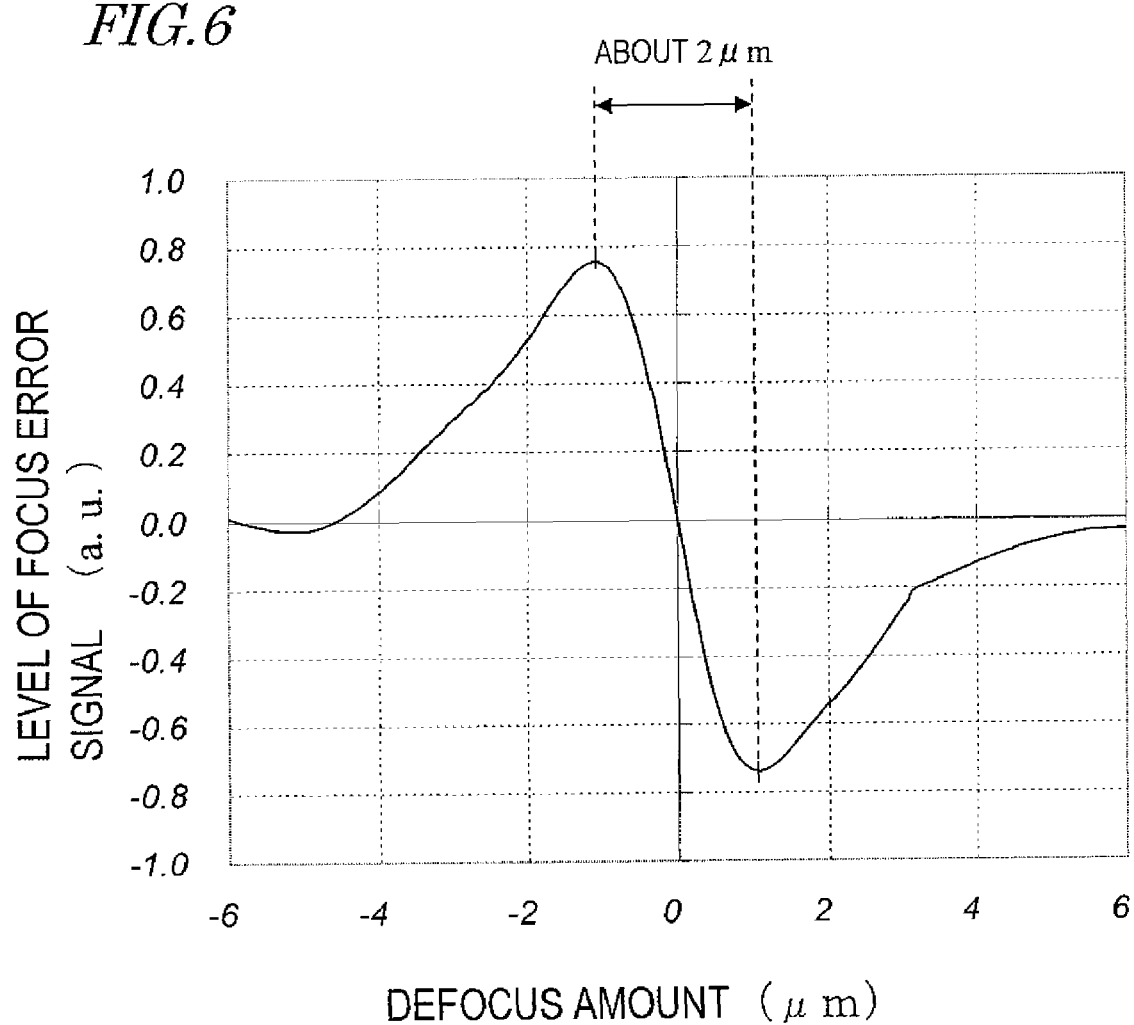
FIG. 6 shows a waveform of a focusing error signal obtained when a DVD is irradiated with red light from a light source 12.
Figure 7:
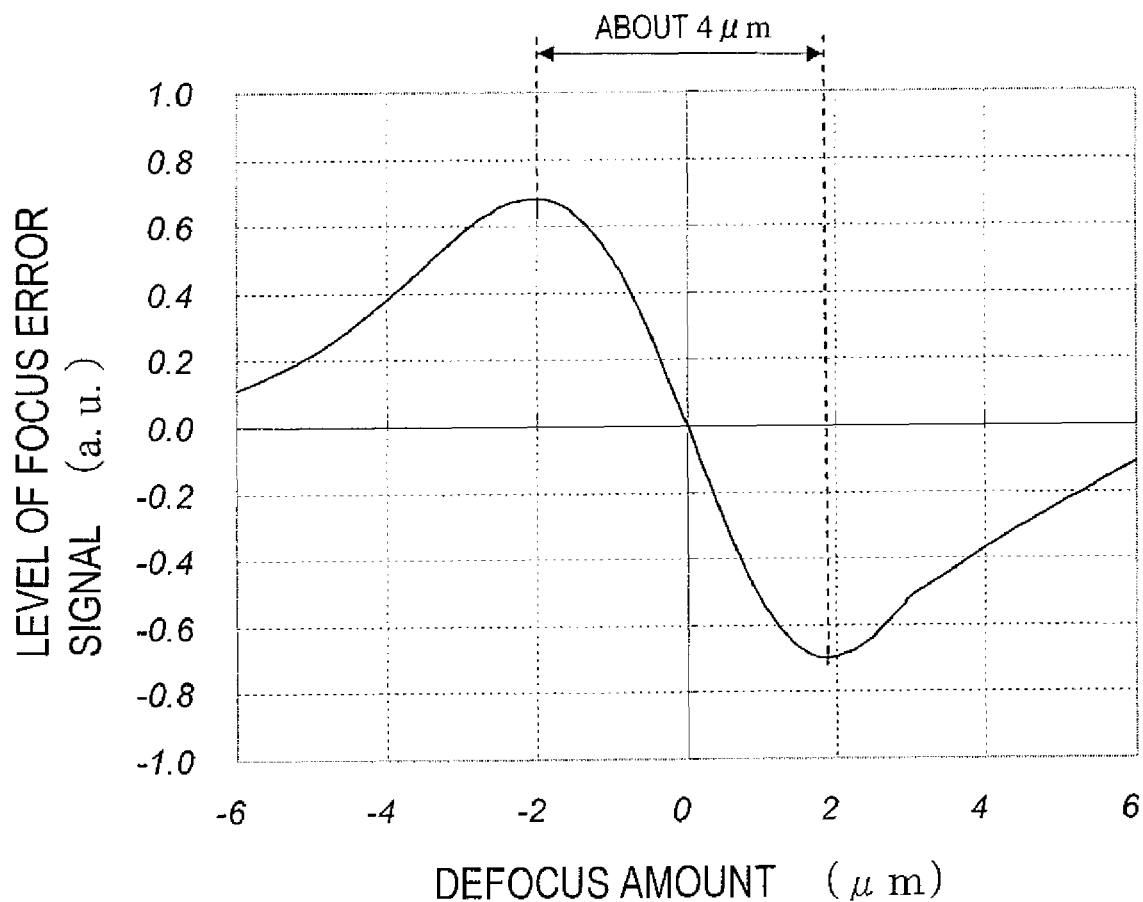
FIG. 7 shows a waveform of a focusing error signal obtained when a CD is irradiated with infrared light from the light source 12.

FIG. 5 through FIG. 7 show waveforms of focusing error signals obtained where the objective lens 9 designed as described above is used.

FIG. 5 shows a waveform of a focusing error signal obtained when a BD is irradiated with blue light from the light source 1. FIG. 6 shows a waveform of a focusing error signal obtained when a DVD is irradiated with red light from the light source 12. FIG. 7 shows a waveform of a focusing error signal obtained when a CD is irradiated with infrared light from the light source 12. In FIG. 5 through FIG. 7, the horizontal axis represents the defocus amount, i.e., the distance in the optical axis direction between the information recording layer and the convergence spot, and the vertical axis represents the intensity of the focusing error signal.

Regarding the focusing error signal for the BD in FIG. 5 and the focusing error signal for the DVD in FIG. 6, the separation between the defocus amounts at which the dynamic range, i.e., the focusing error signal intensity is respectively maximum and minimum is set to about 2 μm. Such design can be realized by setting the thickness of the parallel plate 3, the focal distances between the objective lens 9 (25) and the collimator lens 7, or the like.

While the defocus amount is in the range of about −1 μm to +1 μm, the inclination of the waveform of the focusing error signal for the BD is steep. This means that the sensitivity of the focusing error signal is high. Hence, for the BD, a high sensitivity focusing error signal can be obtained to realize high precision focusing control.

Regarding the focusing error signal for the CD in FIG. 7, the separation between the defocus amounts at which the dynamic range, i.e., the focusing error signal intensity is respectively maximum and minimum, namely, a defocus detection range, can be enlarged to about 4 μm. This value means that the dynamic range of the focusing error signal is wide and is sufficient to start a focus servo loop with certainty. Such a wide dynamic range is realized because the objective lens 9 is designed such that the infrared light 40 passing through the outer peripheral area of the inner zone 40 is given a high-order spherical aberration so as to be converged in the vicinity of convergence point F2, which is slightly away from the objective lens 9.

The focusing error signal is detected utilizing that when the convergence spot on the optical disc is defocused, the position of the luminous flux incident on the light detector 10 (the distance of the luminous flux from the optical axis) changes. In the example shown in FIG. 4(a), the luminous flux is shifted in the optical axis direction by adjusting the manner of giving the spherical aberration. Namely, a part of the luminous flux is given a spherical aberration, whereas another part of the luminous flux is given a high-order spherical aberration so as to be converged in the vicinity of the different convergence point F2. The focusing error signal obtained from these parts of the luminous flux is shifted in the defocus direction with respect to the focusing error signal obtained from the remaining part of the luminous flux. Such a shift enlarges the detection range of the focusing error signal.

Accordingly, with the objective lens 9 according to this embodiment, the focus servo (control) can be stably started even for a CD causing a large face movement.

Figure 4:
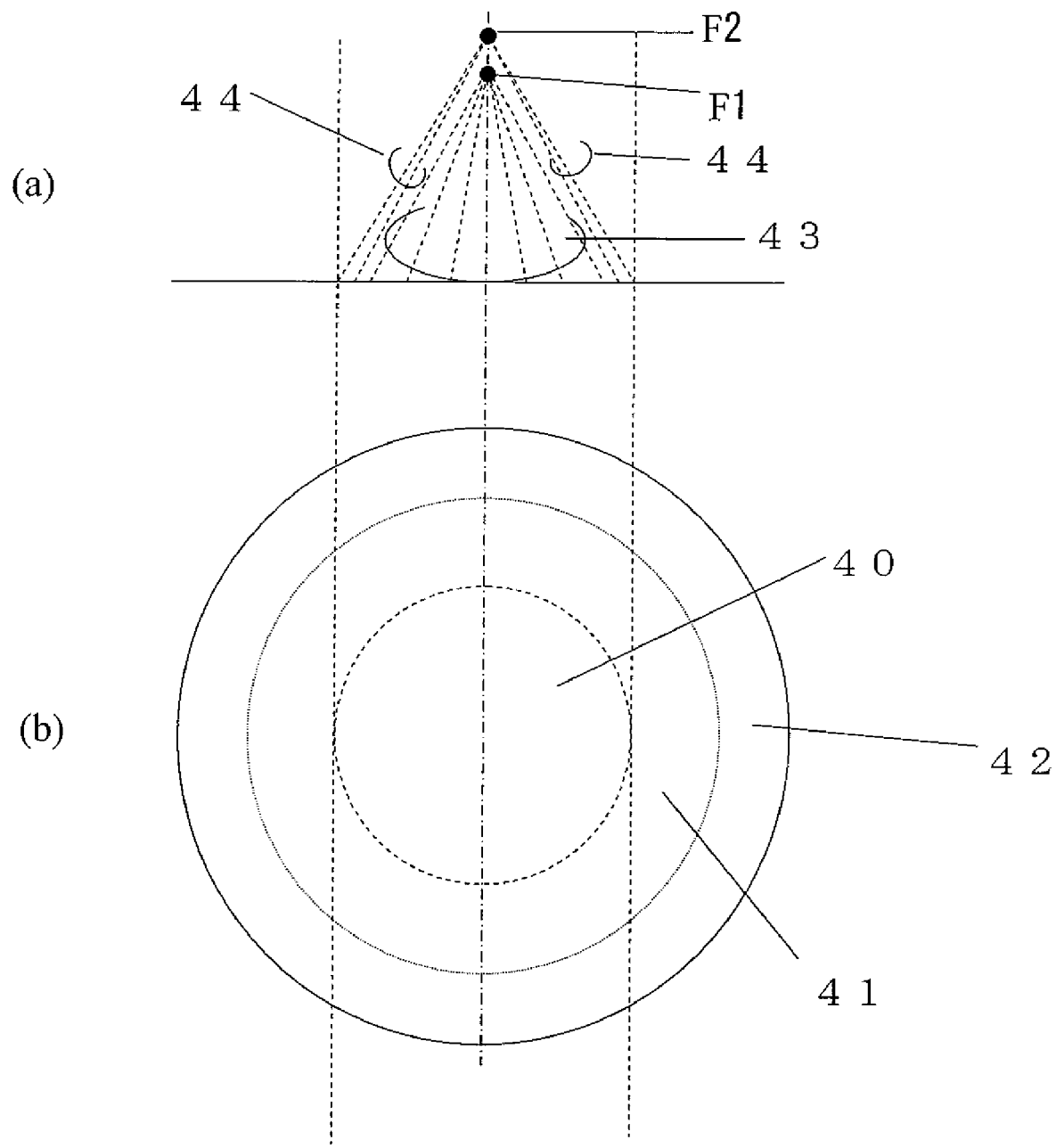
FIG. 4(a) shows a light beam of infrared light transmitting through the objective lens 9.
FIG. 4(b) shows an effective diameter of the objective lens 9 for blue light as seen from a direction of an optical axis.

The objective lens 9 may be designed such that the focal distance of the objective lens for infrared light is longer than the focal distance thereof for blue light. With this structure also, the effect of decreasing the defocus detection sensitivity for infrared light so as to enlarge the defocus detection range therefor can be provided. In general, "focal distance" is defined as a distance between the focal point and the principal point of the objective lens 9. This does not indicate that the distance from the surface of the objective lens 9 (on the light emission side), or from the light emission point, to the convergence point differs for the red light and the blue light. As described above with reference to FIG. 2 and FIG. 4, with the objective lens 9 according to this embodiment, the position of the light collection point (focal point) varies in accordance with the wavelength or the transmission position of the light. Note that FIG. 2 and FIG. 4 show the focal point but not the focal distance. Therefore, it cannot be understood from FIG. 2 or FIG. 4 that the focal distance of the objective lens 9 is varied in accordance with the wavelength.

Embodiment 2

Figure 8:
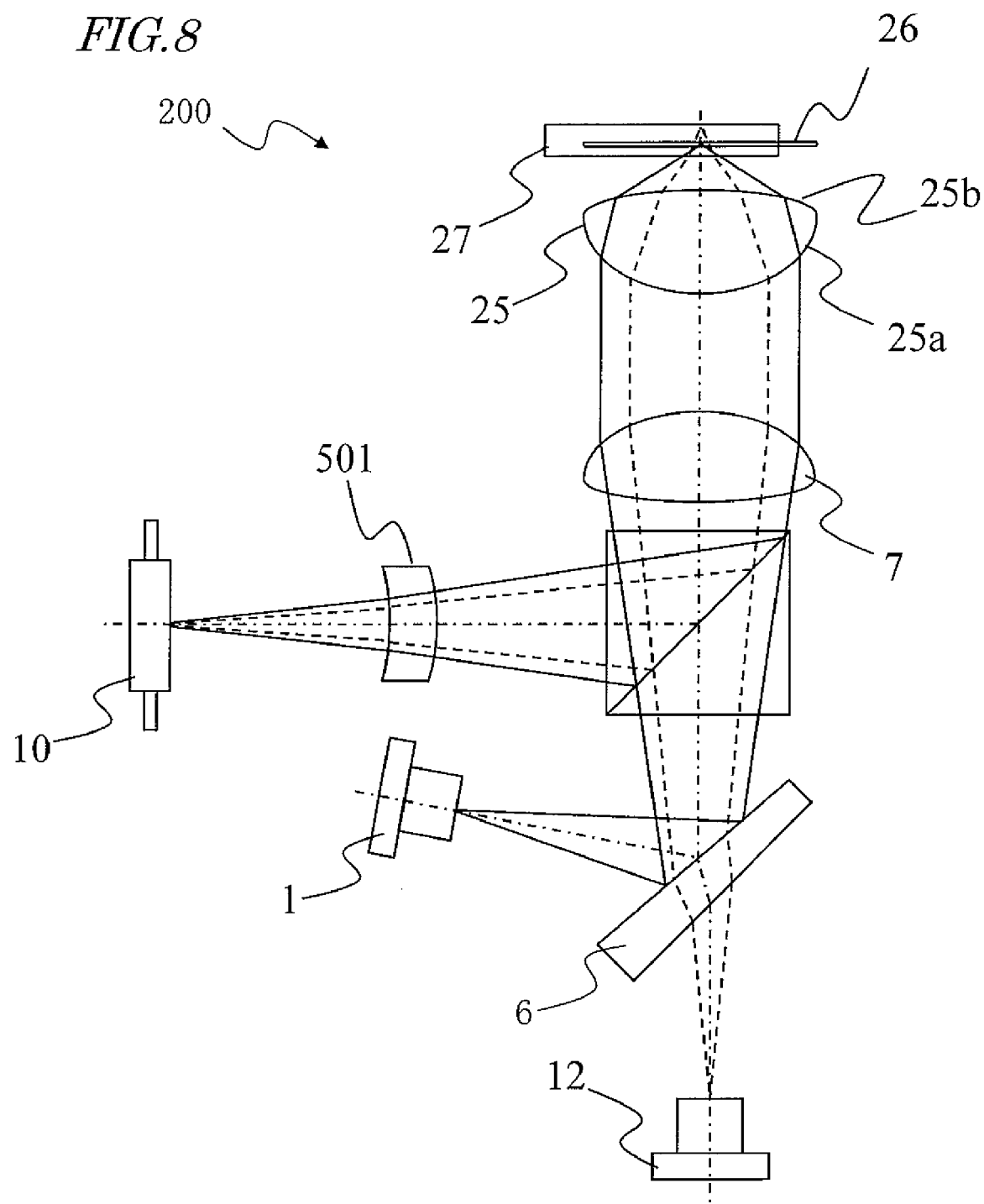
FIG. 8 shows a structure of an optical head device 200 according to Embodiment 2.

FIG. 8 shows a structure of an optical head device 200 according to this embodiment. Among the elements of the optical head device 200, elements having the same functions as those of the elements included in the optical head 100 (FIG. 1) according to Embodiment 1 bear the same reference numerals and descriptions thereof will be omitted.

Main differences are that the optical head device 200 includes a detection lens 501, and an objective lens 25 in place of the objective lens 9.

The detection lens 501 is an anamorphic lens designed so as to have different focal distances along two perpendicular axes in order to detect a focusing error signal by the astigmatism method.

The objective lens 25 is designed as follows. Hereinafter, the objective lens 25 according to this embodiment will be described in detail.

The objective lens 25 has compatibility for BDs, DVDs and CDs. Specific specifications of the objective lens are shown in Tables 1 through 4.

TABLE 1

| Usable wavelength, material refractive index, separation | | | | |
|---|---|---|---|---|
| Optical disc | | BD | DVD | CD |
| Wavelength | [nm] | 405 | 658 | 785 |
| Focal distance | [mm] | 2.30 | 2.37 | 2.39 |
| Refractive index of lens | | 1.63059 | 1.60981 | 1.60585 |
| Refractive index of protective layer | | 1.61735 | 1.57828 | 1.57203 |
| Numerical aperture | | 0.85 | 0.6 | 0.47 |
| Aperture diaphragm diameter | [mm] | 3.92 | 2.77 | 2.20 |
| Object point distance | [mm] | ∞ | −200 | 138 |
| Working distance | [mm] | 0.900 | 0.605 | 0.303 |
| Protective layer thickness | [mm] | 0.0875 | 0.6 | 1.2 |

As shown in Table 1, the wavelength of the laser light and the numerical aperture (NA) used for performing recording to, or reproduction from, BDs, DVDs and CDs are different. As shown regarding the object point distance, laser light is incident on the objective lens as generally parallel light for performing recording to, or reproduction from, a BD; whereas prescribed converged or diverged light is incident on the objective lens for performing recording to, or reproduction from, a DVD or a CD.

TABLE 2

| Face No. | Radius of curvature | Face separation | Material |
|---|---|---|---|
| 0 | ∞ | Object point distance | Air |
| 1 | (−1.563) | 2.364199 | Lens |
| 2 | −8.360 | 0 | Air |
| 3 | ∞ | Working distance | Air |
| 4 | ∞ | Protective layer thickness | Polycarbonate |
| 5 | ∞ | (Information recording face) | — |

In Table 2, each face number represents the following: face number 0 represents the light source, face number 1 represents a first face 25a of the objective lens 25, face number 2 represents a second face 25b of the objective lens, face number 3 represents the reference face of the working distance, face number 4 represents the surface of the protective substrate of the optical disc, and face number 5 represents the information recording layer of the optical disc.

Given as the face separation and the material are the separation, and the material filling the separation, between the face represented by the respective face number and the face represented by the next face number. Regarding the object point distance, the working distance and the protective substrate thickness, the BD, DVD and CD each have the object point distance, the working distance and the protective substrate thickness shown in Table 1.

The first face 25a and the second face 25b of the objective lens 25 are respectively a face of the objective lens 25 facing the collimator lens 7 and a face of the objective lens 25 facing the optical disc 26.

Regarding the aspheric shape of the first face 25a and the second face 25b of the objective lens 25, the distance (sag) Z from the tangent plane on the optical axis in the optical axis direction is represented by the following expression, where h is the distance in a direction perpendicular to the optical axis, R is the radius of curvature on the paraxial, k is the conic constant, and Ai is the aspheric coefficient where i=0th to n'th term.

$$Z = \frac{h^2/R}{1+\sqrt{1-(1+k)(h/R)^2}} + \sum_{i=0}^{n} A_i h^{2i}$$ [Expression 1]

The first face 25a of the objective lens 25 is divided into an inner zone and an outer zone which are concentrically arranged around the optical axis. The inner zone and the outer zone have different aspheric shapes. The inner zone has a diameter of 2.78 mm, which is generally the same as the aperture diaphragm diameter of the DVD shown in Table 1.

Table 3 shows the conic constant k and the aspheric coefficient Ai which define the shape of each of the first face 25a and the second face 25b. "E" represents the power in the case where the radix is 10 and the numerical figure right to E is the exponent. For example, "E−02" represents ten to the power of minus two ($10^{-2}$).

TABLE 3

Aspheric coefficient of the objective lens

| Face of the objective lens | First face | | Second face |
|---|---|---|---|
| | Inner zone | Outer zone | |
| Diameter | 2.780 | — | — |
| R | 1.562919E+00 | 1.918229E+00 | −8.360050E+00 |
| k | −9.091400E−01 | −4.099720E−01 | 0.0 |
| A0 | 0.0 | 3.615405E−02 | 0.0 |
| A1 | 0.0 | 0.0 | 0.0 |
| A2 | 1.289825E−02 | 3.843053E−02 | 1.097133E−01 |
| A3 | 1.481426E−03 | −4.039772E−03 | −1.133723E−01 |
| A4 | 1.866669E−04 | −1.228919E−03 | 9.179145E−02 |
| A5 | −4.535987E−05 | 4.576172E−04 | −4.240251E−02 |
| A6 | −3.596199E−06 | −1.357717E−04 | 2.599427E−03 |
| A7 | 1.184700E−05 | 7.266720E−05 | 7.200437E−03 |
| A8 | −2.211288E−06 | −1.160691E−05 | −3.508770E−03 |
| A9 | 0.0 | 0.0 | 6.801656E−03 |
| A10 | 0.0 | 0.0 | −4.848957E−05 |

The objective lens 25 according to this embodiment further includes a diffraction structure on the first face 25a.

The differential phase detection function φ defining the diffraction structure is represented by the following expression, where h is the distance in a direction perpendicular to the optical axis, M is the number of diffraction order, and ai is the constant where i=second to n'th term.

$$\phi = M \sum_{i=1}^{n} a_i h^{2i}$$ [Expression 2]

Table 4 shows the differential phase detection function which defines the diffraction structure formed on the first face 25a of the objective lens 25. For all of the BD, DVD and CD, the diffraction order number M=1.

TABLE 4

Phase shift function of the objective lens

| Face of the objective lens | First face | |
|---|---|---|
| | Inner zone | Outer zone |
| Diameter | 2.780 | — |
| a1 | 0.000000E+00 | 0.000000E+00 |
| a2 | −2.565179E+01 | −1.773514E+01 |
| a3 | −2.129913E+00 | −7.267530E+00 |
| a4 | −1.193912E+00 | 1.292995E+00 |

In the optical head device 200 shown in FIG. 8, the focal distance of the collimator lens 7 is 16.1 mm. Regarding the synthesized focal distance of the detection lens 501 and the collimator lens 7, the focal distance of the anterior focal line is 42.4 mm and the focal distance of the posterior focal line is 46.0 mm.

Figure 9:
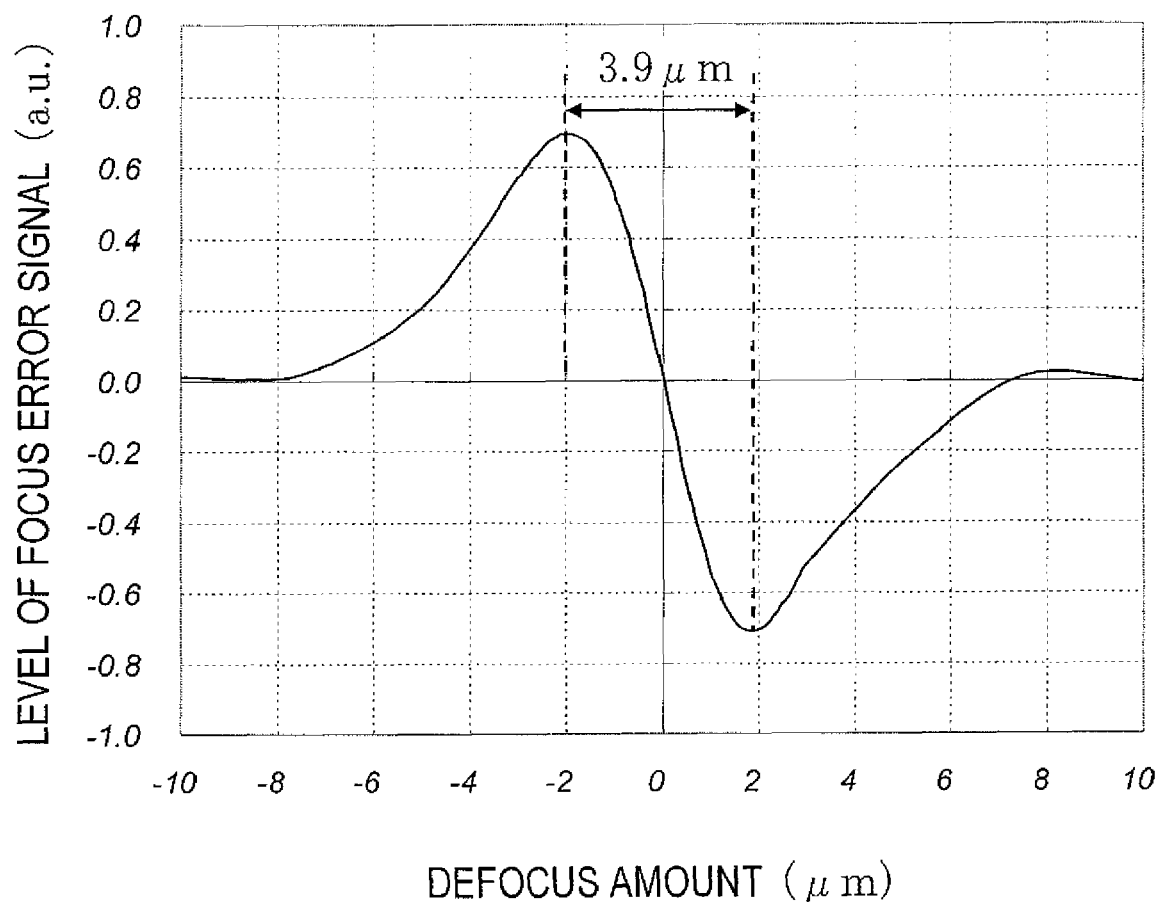
FIG. 9 shows a focusing error signal for a CD, in the optical head device 200 using the objective lens 25, obtained by calculation.

FIG. 9 shows a focusing error signal for a CD, in the optical head device 200 using the objective lens 25, obtained by calculation. The defocus detection range of the CD is about 3.9 μm. As in Embodiment 1, it is understood that a wide dynamic range is obtained. Thus, a focus servo loop can be started with certainty.

Figure 10:
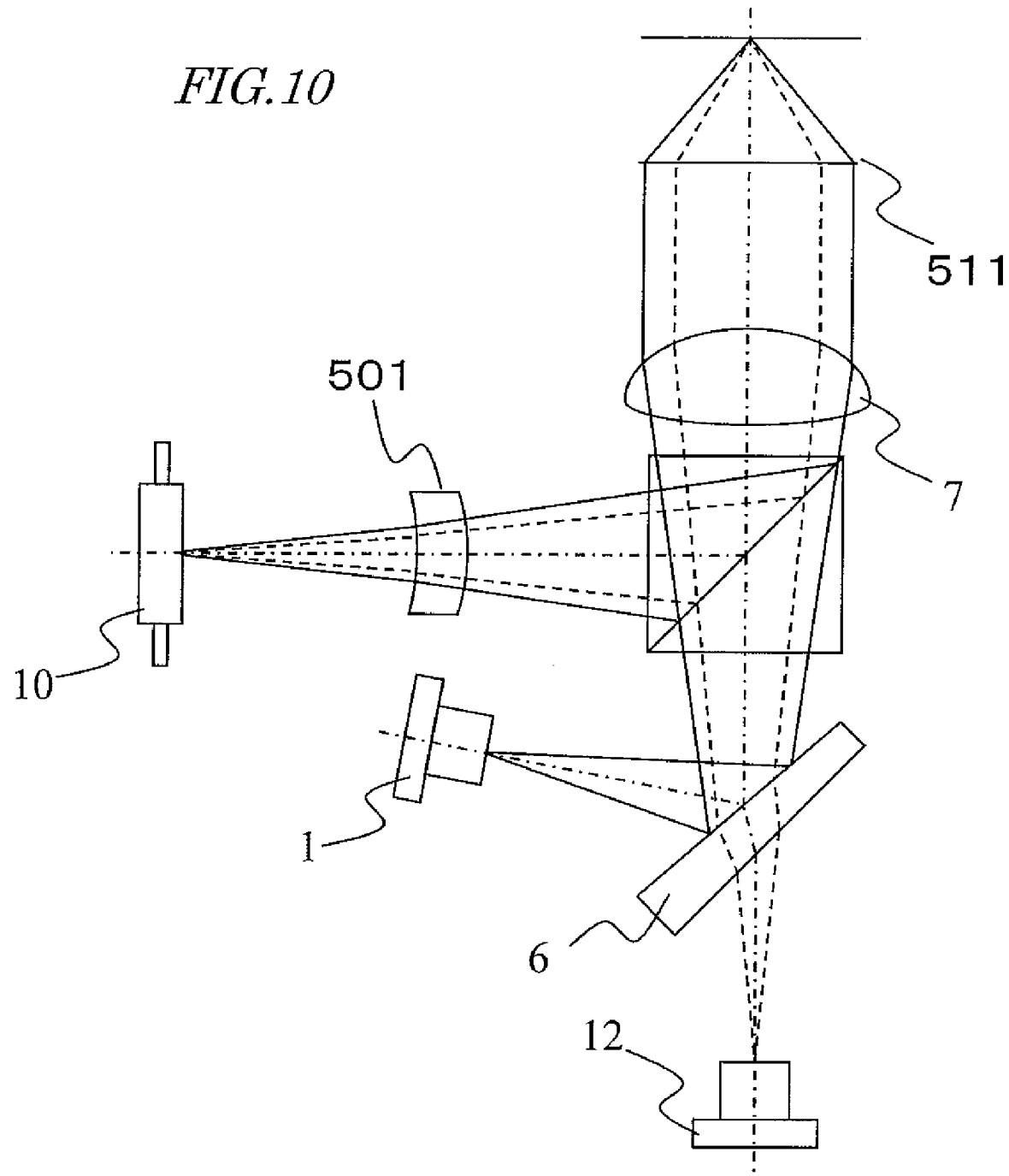
FIG. 10 shows a reference example of an optical head using a paraxial lens 511.

FIG. 10 schematically shows an optical head device including a paraxial lens 511 in place of the objective lens 25 shown in FIG. 8. Herein, the term "paraxial lens" means an "ideal lens having a thickness of zero" which is capable of collecting light with no aberration. Regarding the CD, the paraxial lens 511 is assumed to have the same focal distance to that of the objective lens 25 in FIG. 8.

Figure 11:
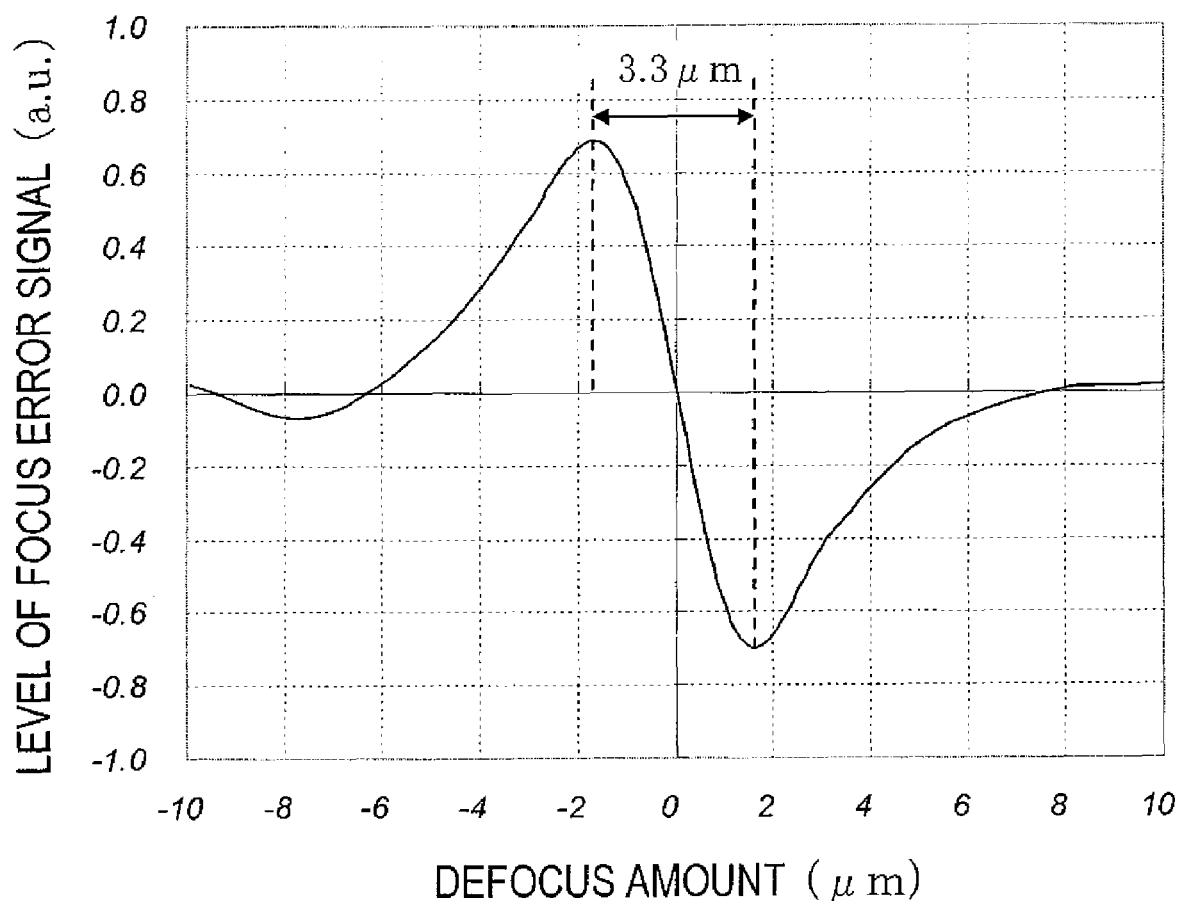
FIG. 11 shows a focusing error signal for a CD, in an optical head device shown in FIG. 10, obtained by calculation.

FIG. 11 shows a focusing error signal for a CD, in the optical head device shown in FIG. 10 where the paraxial lens 511 is used as the objective lens 25, obtained by calculation. According to FIG. 11, the defocus detection range of the CD is about 3.3 μm.

As is clear from comparing FIG. 9 and FIG. 11, use of the objective lens 25 allows the defocus detection range (so-called S-zone) for the CD to be increased by about 0.6 μm as compared with the result of calculation conducted using the paraxial lens 511. Namely, the defocus detection range for the CD can be increased by using the objective lens 25 according to this embodiment in place of a conventional objective lens proving no spherical aberration. Accordingly, the optical head device according to this embodiment can perform focus servo more stably even for a CD causing a large face movement.

Embodiment 3

Figure 12:
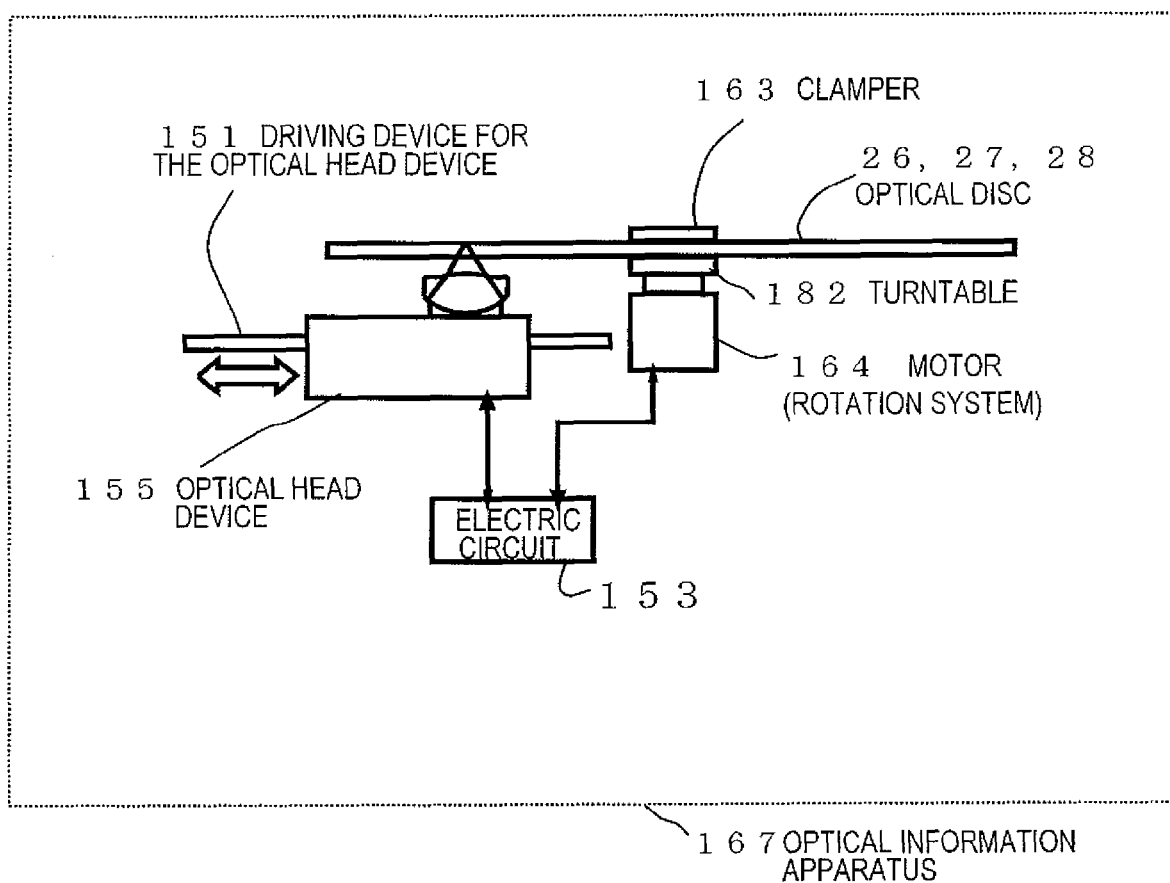
FIG. 12 shows a structure of an optical information apparatus 167 according to Embodiment 3 including the optical head device according to Embodiment 1 or 2.

FIG. 12 shows a structure of an optical information apparatus 167 using the optical head device according to Embodiment 1 or 2. In the following, the optical head device according to Embodiment 1 is used as an example.

In FIG. 12, an optical disc 26 (or 27 or 28; as applied hereinafter) is put on a turntable 182 and rotated by a motor 164. An optical head device 155 according to Embodiment 1 is fluttered by a driving device 151 for the optical head device up to a position of a track of the optical disc where desired information is existent.

The optical head device 155 transmits a focusing error signal or a tracking error signal to an electric circuit 153 in correspondence with the positional relationship between the optical head device 155 and the optical disc 26. In response to the signal, the electric circuit 153 transmits a signal for fine-moving the objective lens to the optical head device 155. Based on this signal, the optical head device 155 performs focus servo (control) and tracking control on the optical disc and thus can read, write (record) or erase information.

The optical information apparatus according to this embodiment uses the above-described optical head device, and therefore can stably record information to, or reproduce information from, a plurality of optical discs of different recording densities with one such optical head device.

Embodiment 4

Figure 13:
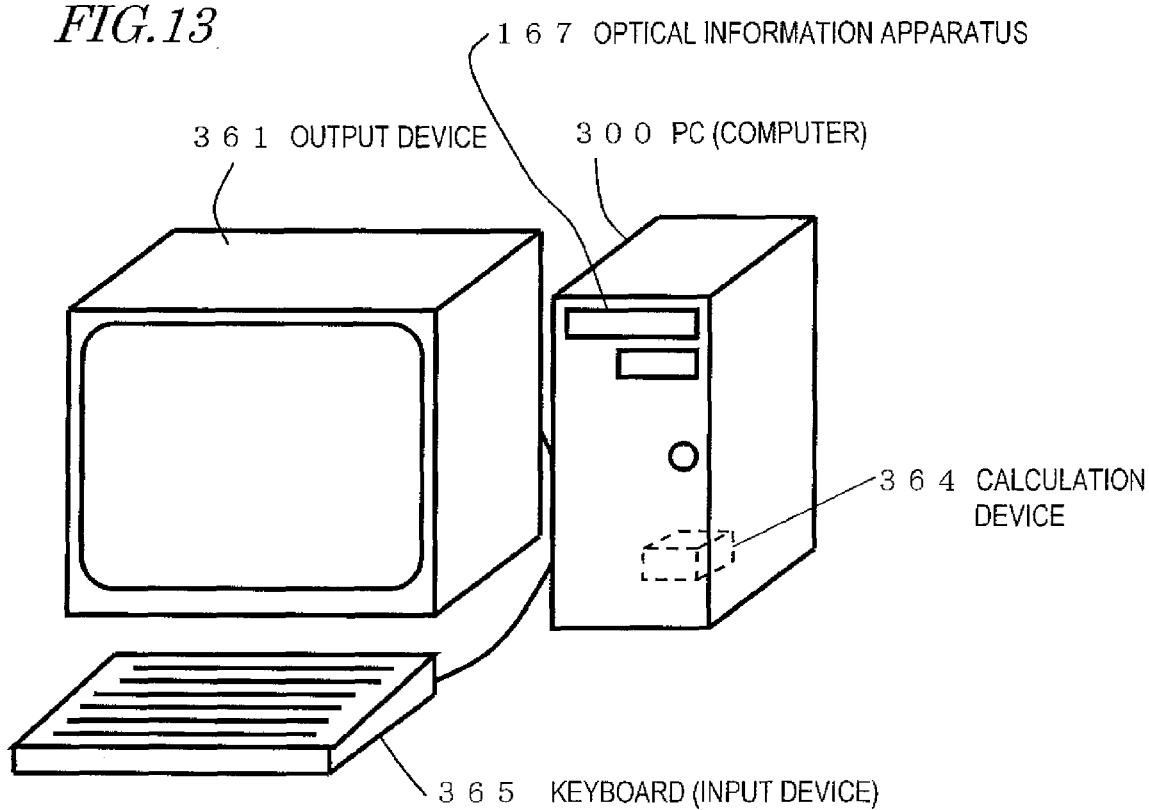
FIG. 13 shows a structure of a computer (PC) 300 according to Embodiment 4 including the optical information apparatus 167 according to Embodiment 3.

FIG. 13 shows a structure of a computer (PC) 300 including the optical information apparatus 167 according to Embodiment 3.

The PC 300 includes a calculation device 364 and the optical information apparatus 167 according to Embodiment 3. The PC 300 forms a computer system together with a separate output device 361 and a separate input device 365.

The input device 365 is a keyboard, a mouse, a touch panel or the like for inputting information. The calculation device 364 includes, for example, a central processing unit (CPU) for performing calculations based on information input from the input device or information read by the optical information apparatus 167. The output device 361 is a cathode ray tube, a liquid crystal display device, a printer or the like for displaying information, such as a calculation result obtained by the calculation device 364 or the like.

In the case of a laptop PC, the PC 300, the input device 365 and the output device 361 are integrated together.

A computer including the optical information apparatus according to Embodiment 3 or adopting the above-described recording or reproduction method can stably record information to, or reproduce information from, different types of optical discs and so is usable for various applications.

Embodiment 5

Figure 14:
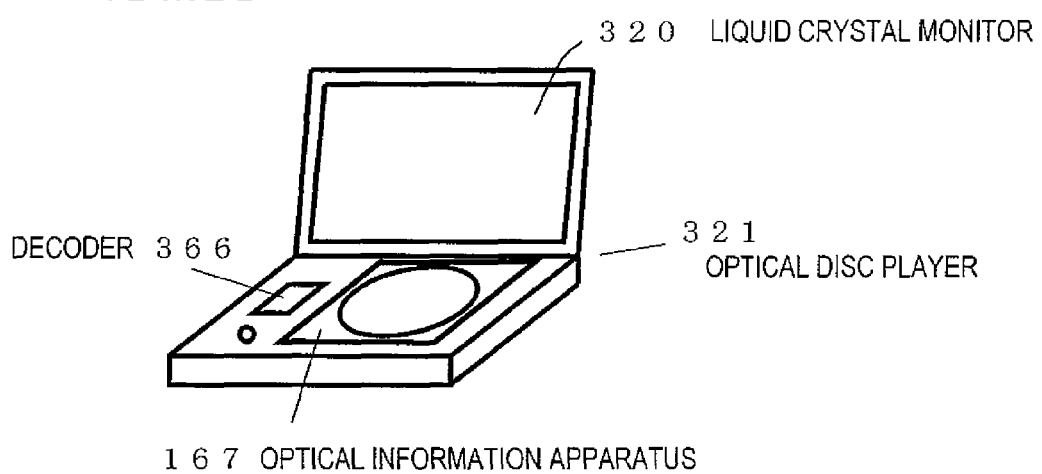
FIG. 14 shows a structure of an optical disc player 321 according to Embodiment 5 including the optical information apparatus 167 according to Embodiment 3.

FIG. 14 shows a structure of an optical disc player 321 including the optical disc apparatus 167 according to Embodiment 3.

The optical disc player 321 includes the optical information apparatus 167 according to Embodiment 3, a liquid crystal monitor 320, and a decoder 366. The decoder 366 is a conversion device or a conversion circuit for converting an information signal obtained by the optical information apparatus 167 into an image or audio data. The liquid crystal monitor 320 outputs a post-conversion image.

An optical disc player including the optical information apparatus according to Embodiment 3 or adopting the above-described recording or reproduction method can stably record information to, or reproduce information from, different types of optical discs and so is usable for various applications.

The optical disc player 321, when combined with a positional sensor such as a GPS or the like and a central processing unit (CPU) and also geographical data stored on an optical disc (for example, a CD, DVD or BD), is usable as a car navigation system. The display device 320 is not absolutely necessary and is not an essential element of the optical disc player 321.

Embodiment 6

Figure 15:
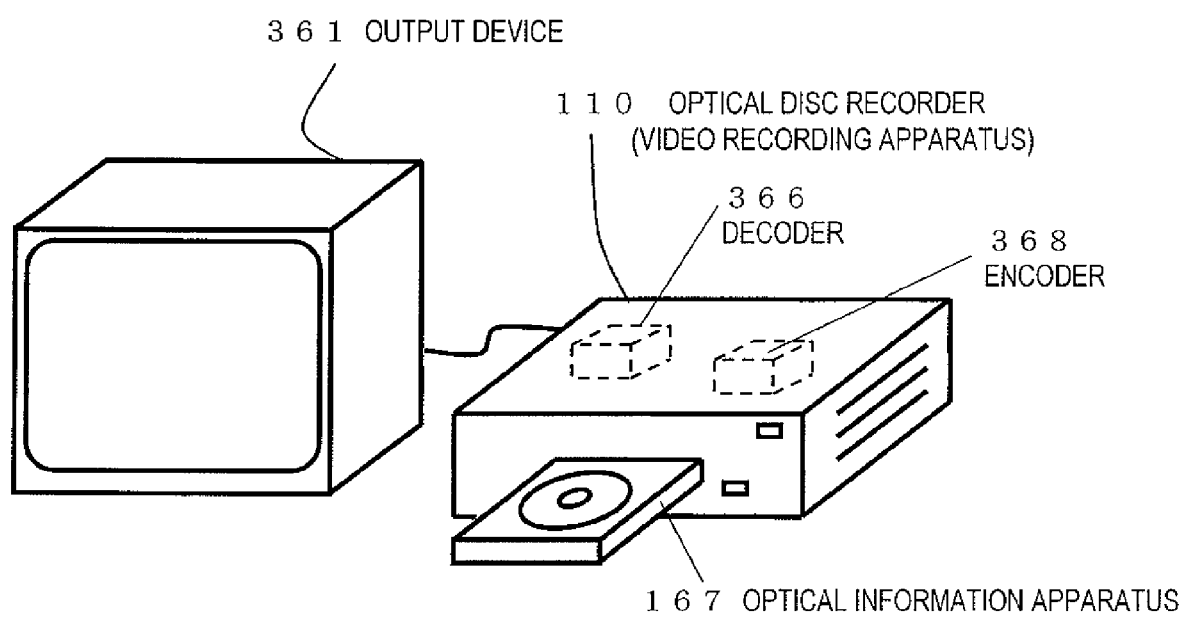
FIG. 15 shows a structure of an optical disc recorder 110 according to Embodiment 6 including the optical information apparatus 167 according to Embodiment 3.

FIG. 15 shows a structure of an optical disc recorder 110 including the optical information apparatus 167 according to Embodiment 3.

The optical disc recorder 110 includes the optical information apparatus 167 according to Embodiment 3, the decoder 366, and an encoder 368. The decoder 366 is as described above in Embodiment 5. The encoder 368 converts image information into information of a format recordable on an optical disc (for example, a CD, DVD or BD) by the optical information apparatus.

It is usually preferable that the decoder 366 is provided so that an information signal obtained by the optical information apparatus 167 can be converted into an image or audio data and output to the output device 361, because this enables already recorded information to be reproduced. However, it is not absolutely necessary to provide the decoder 366.

The output device 361 is a cathode ray tube or a liquid crystal display device, but may be a printer. The output device 361 is not absolutely necessary for the optical disc recorder 110.

Embodiment 7

Figure 16:
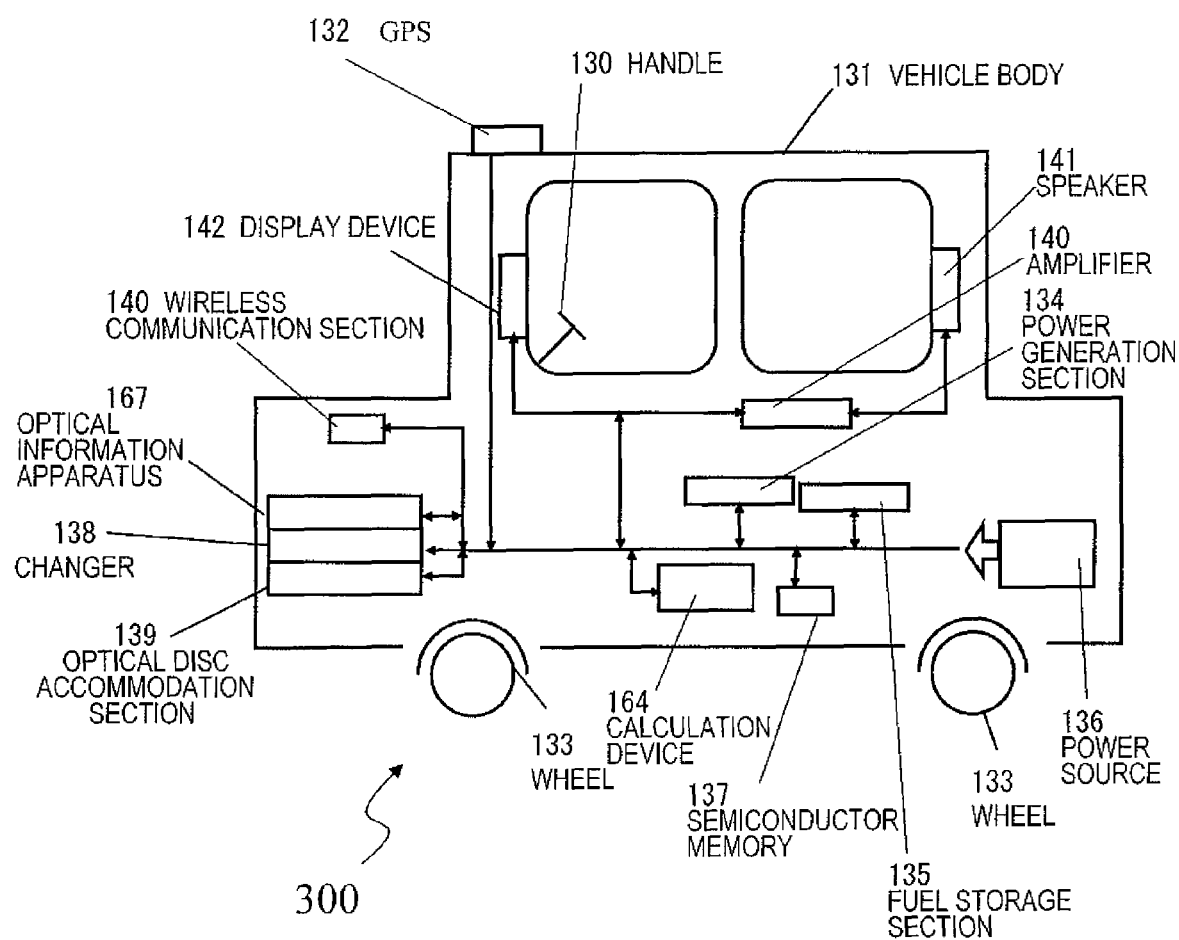
FIG. 16 shows a structure of a vehicle 300 according to Embodiment 7 including the optical information apparatus 167 according to Embodiment 3.
Figure 17:
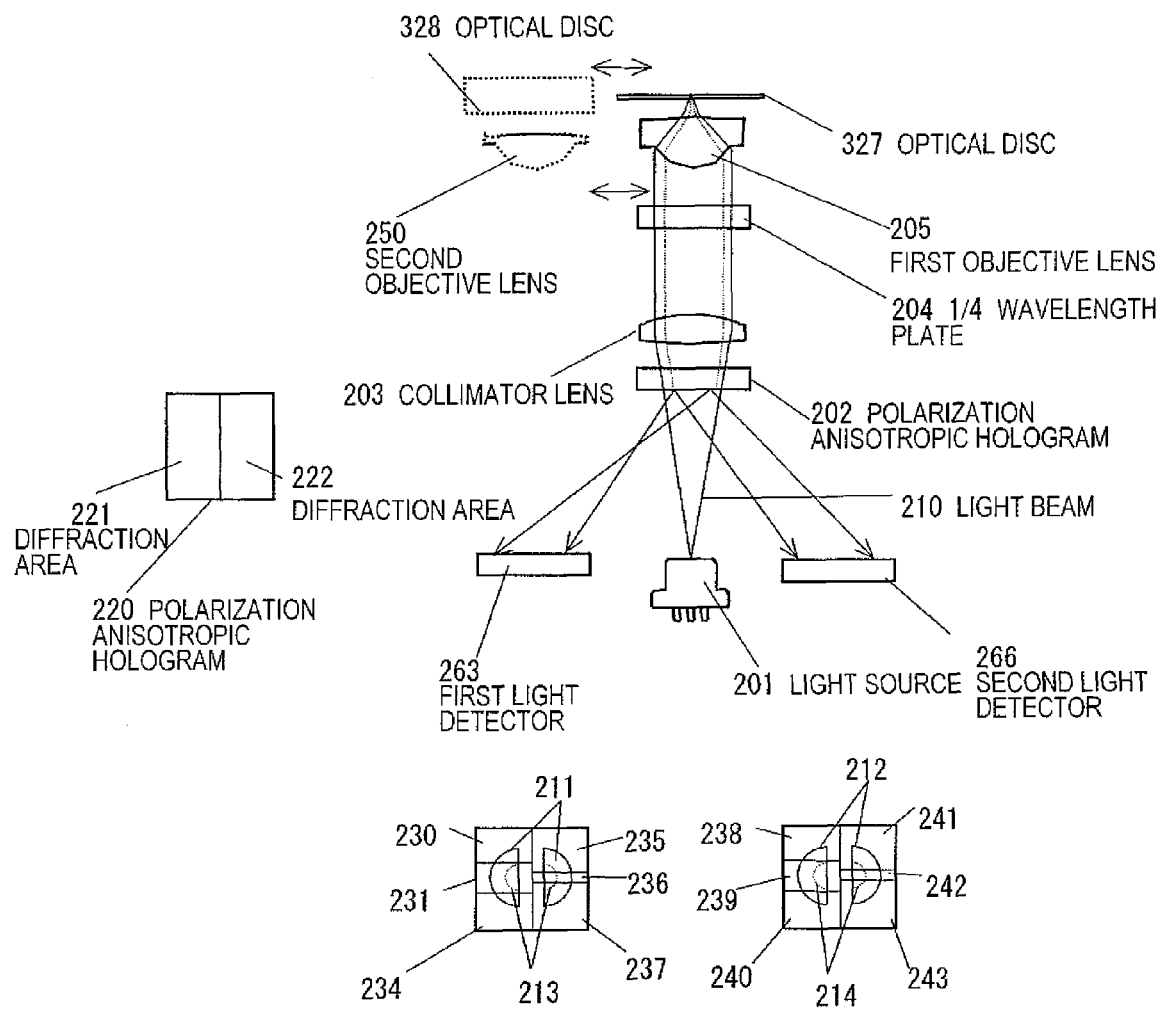
FIG. 17 shows an example of a structure of a conventional optical head device.

FIG. 16 shows a structure of a vehicle 300 including the optical disc apparatus 167 according to Embodiment 3. The vehicle 300 is a train car or an automobile. In the example of FIG. 16, the vehicle 300 is an automobile.

The vehicle 300 includes a handle 130, a vehicle body 131 having the optical information apparatus 167 mounted thereon, a GPS unit 132, wheels 133, a power generation section 134, a fuel storage section 135, and a power source 136.

The power generation section 134 generates power for moving the vehicle body 131. The power generation section 134 is, for example, an engine. The fuel storage section 135 stores fuel to be provided to the power generation section 134.

By mounting the optical disc apparatus 167 on the vehicle body 131, an effect of allowing a user to stably obtain information from, or record information to, various types of optical discs while staying in the vehicle body 131 can be provided.

By additionally providing a changer 138 or an optical disc accommodation section 139 in the vehicle body 131, it is made possible to use a larger number of optical discs easily.

By providing the calculation device 164 for processing information obtained from an optical disc to generate image or audio information, a semiconductor memory 137 for temporarily storing information, or a display device 142, it is made possible to reproduce a moving image such as a movie or the like from the optical disc.

By providing an amplifier 140 and a speaker 141, it is made possible to reproduce audio data or music from an optical disc. By providing a positional sensor such as a GPS unit 132 or the like, it is made possible to allow the user to learn the current position or the moving direction of the vehicle 300 from an image displayed on the display device 142 or audio data output from the speaker 141 together with geographical information reproduced from an optical disc. By providing a wireless communication section 140, it is made possible to allow the user to obtain information from outside to be used complimentarily with the information obtained from the optical disc.

In Embodiments 5 and 6, neither FIG. 14 nor FIG. 15 shows an input device. For example, a keyboard, a touch panel, a mouse, a remote control device or the like may be provided. In Embodiments 4 through 6, the input device may be separately sold, in which case only an input terminal may be provided.

INDUSTRIAL APPLICABILITY

An optical head device according to the present invention can perform recording to, or reproduction from, a plurality types of optical discs which are different in the substrate thickness, usable wavelength, recording density or the like. A compatible optical information apparatus using such an optical head can handle many standards of optical discs including CD, DVD and BD. Accordingly, such an optical information apparatus is applicable to any system for storing information on an optical disc, such as a computer, an optical disc player, an optical disc recorder, a car navigation system, an editing system, a data server, an AV component, a vehicle or the like.

The invention claimed is:

1. An optical head device, comprising:
   a plurality of light sources switchably usable;
   an objective lens for converging light emitted from one of the plurality of light sources to an information recording layer of an optical disc;
   a light detector for receiving the light reflected by the information recording layer and outputting an electric signal based on the amount of the received light; and
   an optical element located on an optical path on which the light reflected by the information recording layer proceeds until being incident on the light detector, the optical element giving astigmatism to the light transmitting therethrough;
   wherein:
   the plurality of light sources include a first light source for emitting light having a first wavelength and a second light source for emitting light having a second wavelength shorter than the first wavelength;
   a defocus detection range of a focusing error signal obtained from an electric signal based on the amount of received light having the first wavelength is wider than a defocus detection range of a focusing error signal obtained from an electric signal based on the amount of received light having the second wavelength;
   the light having the first wavelength reflected by the information recording layer and the light having the second wavelength reflected from the information recording layer are both incident on the light detector;
   the light detector performs photoelectric conversion on the incident light to generate an electric signal for obtaining a focusing error signal; and
   the light detector receives the light reflected by the information recording layer and given the astigmatism to generate the focusing error signal by an astigmatism method.

2. The optical head device of claim 1, further comprising a rising mirror for turning the light emitted from one of the plurality of light sources in a direction vertical to the optical disc;
   wherein an optical axis of the light incident on the rising mirror has an angle of about 45 degrees with respect to a track groove of the optical disc.

3. The optical head device of claim 1, wherein the light having the first wavelength emitted from the first light source and the light having the second wavelength emitted from the second light source are both incident on the objective lens.

4. The optical head device of claim 3, wherein:
   the objective lens includes at least an inner zone including an optical axis and an outer zone surrounding the inner zone, and the inner zone includes a central area including the optical axis and an outer peripheral area outer with respect to the central area; and
   the light having the first wavelength passing through the central area is converged to a first position on the information recording layer of the optical disc, and the light having the first wavelength passing through the outer peripheral area is given a spherical aberration to be converged to at least one second position, which is different from the first position in a direction vertical to the optical disc.

5. The optical head device of claim 4, wherein the light having the first wavelength passing through the outer peripheral area is converged to a position farther from the objective lens than the first position by the spherical aberration.

6. The optical head device of claim 4, wherein:
   the plurality of light sources further include a third light source for emitting light having a third wavelength longer than the second wavelength;
   wherein the objective lens converges the light, having the first wavelength passing through the central area of the inner zone, through a transparent substrate of the first optical disc; converges the light, having the third wavelength passing through the inner zone and the outer zone, through a transparent substrate of the third optical disc; and converges the light, having the second wavelength passing through an effective diameter zone of the objective lens, through a transparent substrate of the second optical disc.

7. The optical head device of claim 4, wherein the inner zone of the objective lens is designed such that an average value of sums of squares of the aberrations of the light having the first wavelength passing through the inner zone is equal to or less than 20 mλ.

8. The optical head device of claim 3, wherein a focal distance f1 of the objective lens for converging the light having the first wavelength is longer than a focal distance f2 of the objective lens for converging the light having the second wavelength.

9. The optical head device of claim 8, wherein:
   the light having the first wavelength reflected by the information recording layer and the light having the second wavelength reflected by the information recording layer are both incident on the light detector; and
   the light detector performs photoelectric conversion on the incident light to generate an electric signal for obtaining a focusing error signal.

10. The optical head device of claim 1, further comprising:
    a parallel plate for reflecting the light having the second wavelength emitted from the second light source; and
    an optical element for reflecting the light having the second wavelength reflected by the parallel plate and transmitting the light having the first wavelength emitted from the first light source.

11. An objective lens used, in an optical head device including a plurality of light sources switchably usable, for converging light emitted from one of the plurality of light sources to an information recording layer of an optical disc, wherein:
    the plurality of light sources of the optical head device include a first light source for emitting light having a first wavelength and a second light source for emitting light having a second wavelength shorter than the first wavelength;
    the objective lens includes at least an inner zone including an optical axis and an outer zone surrounding the inner zone, and the inner zone includes a central area including the optical axis and an outer peripheral area outer with respect to the central area; and
    the light having the first wavelength passing through an central area is converged to a first position on the information recording layer of the optical disc, and the light having the first wavelength passing through an outer peripheral area is given a spherical aberration to be converged to at least one second position, which is different from the first position in a direction vertical to the optical disc, wherein the inner zone is designed such that an average value of sums of squares of the aberrations of the light having the first wavelength passing through the inner zone is equal to or less than 20 mλ.

12. The objective lens of claim 11, wherein the light having the first wavelength passing through the outer peripheral area is converged to a position farther from the objective lens than the first position by the spherical aberration.

13. The objective lens of claim 11, wherein in the case where the plurality of light sources of the optical head device further include a third light source for emitting light having a third wavelength shorter than the second wavelength, the objective lens converges the light, having the first wavelength passing through the central area of the inner zone, through a transparent substrate of the first optical disc; converges the light, having the third wavelength passing through the inner zone and the outer zone, through a transparent substrate of the third optical disc; and converges the light, having the second wavelength passing, through an effective diameter zone of the objective lens through a transparent substrate of the second optical disc.

14. The objective lens of claim 11, wherein a focal distance f1 for converging the light having the first wavelength is longer than a focal distance f2 for converging the light having the second wavelength.

15. An optical information apparatus, comprising:
the optical head device of claim 1;
a motor for rotating the optical disc; and
a circuit for controlling and driving the motor, an optical lens and the light source based on a signal obtained from the optical head device.

16. A computer, comprising:
the optical information apparatus of claim 15;
an input device or an input terminal for inputting information;
a calculation device for performing a calculation based on at least one of information input from the input device and information reproduced by the optical information apparatus; and
an output device or an output terminal for displaying or outputting at least one of information input from the input device, information reproduced by the optical information apparatus, and a calculation result obtained by the calculation device.

17. An optical disc player, comprising:
the optical information apparatus of claim 15; and
an information-to-image decoder for converting an information signal obtained by the optical information apparatus into an image.

18. An optical head device, comprising:
a plurality of light sources switchably usable;
an objective lens for converging light emitted from one of the plurality of light sources to an information recording layer of an optical disc; and
a light detector for receiving the light reflected by the information recording layer and outputting an electric signal based on the amount of the received light;
wherein:
the plurality of light sources include a first light source for emitting light having a first wavelength and a second light source for emitting light having a second wavelength shorter than the first wavelength;
a defocus detection range of a focusing error signal obtained from an electric signal based on the amount of received light having the first wavelength is wider than a defocus detection range of a focusing error signal obtained from an electric signal based on the amount of received light having the second wavelength;
the light having the first wavelength and the light having the second wavelength are both incident on the objective lens;
the objective lens includes at least an inner zone including an optical axis and an outer zone surrounding the inner zone, and the inner zone includes a central area including the optical axis and an outer peripheral area outer with respect to the central area; and
the light having the first wavelength passing through the central area is converged to a first position on the information recording layer of the optical disc, and the light having the first wavelength passing through the outer peripheral area is given a spherical aberration to be converged to at least one second position, which is different from the first position in a direction vertical to the optical disc.

* * * * *

UNITED STATES PATENT AND TRADEMARK OFFICE
CERTIFICATE OF CORRECTION

| | | |
|---|---|---|
| PATENT NO. | : 8,050,168 B2 | Page 1 of 1 |
| APPLICATION NO. | : 12/374403 | |
| DATED | : November 1, 2011 | |
| INVENTOR(S) | : Yoshiaki Komma, Fumitomo Yamasaki and Katsuhiko Hayashi | |

It is certified that error appears in the above-identified patent and that said Letters Patent is hereby corrected as shown below:

Column 22, line 63, "passing through an" should read -- passing through the --.

Signed and Sealed this
Twelfth Day of June, 2012

David J. Kappos
*Director of the United States Patent and Trademark Office*